(12) United States Patent
Fuller et al.

(10) Patent No.: US 11,047,456 B2
(45) Date of Patent: Jun. 29, 2021

(54) VARIATORS

(71) Applicant: ALLISON TRANSMISSION, INC., Indianapolis, IN (US)

(72) Inventors: John Fuller, Lancashire (GB); David Burtt, Lancashire (GB); Michael Holmes, Lancashire (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 1095 days.

(21) Appl. No.: 15/522,901

(22) PCT Filed: Nov. 2, 2015

(86) PCT No.: PCT/GB2015/053299
§ 371 (c)(1),
(2) Date: Apr. 28, 2017

(87) PCT Pub. No.: WO2016/067058
PCT Pub. Date: May 6, 2016

(65) Prior Publication Data
US 2017/0314654 A1 Nov. 2, 2017

(30) Foreign Application Priority Data
Oct. 31, 2014 (GB) ..................................... 1419494

(51) Int. Cl.
*F16H 15/38* (2006.01)
*F16H 61/664* (2006.01)
*F02B 39/06* (2006.01)

(52) U.S. Cl.
CPC ............. *F16H 15/38* (2013.01); *F02B 39/06* (2013.01); *F16H 61/6649* (2013.01); *F16H 2015/383* (2013.01)

(58) Field of Classification Search
CPC .. F16H 15/38; F16H 1/6649; F16H 2015/383; F02B 39/06
See application file for complete search history.

(56) References Cited

U.S. PATENT DOCUMENTS

| | | | |
|---|---|---|---|
| 6,440,232 B1* | 8/2002 | Takemura | F16H 15/38 148/319 |
| 2002/0002778 A1* | 1/2002 | Ikeda | F16H 15/38 33/520 |

(Continued)

FOREIGN PATENT DOCUMENTS

| | | |
|---|---|---|
| GB | 2438412 | 11/2007 |
| WO | 2007051827 | 5/2007 |

(Continued)

*Primary Examiner* — David M Fenstermacher
(74) *Attorney, Agent, or Firm* — Taft Stettinius & Hollister LLP; Stephen F. Rost

(57) ABSTRACT

A variator for a mechanical transmission system is disclosed. Transfer means are in rolling contact with input and output members of the variator to transfer rotary motion between them. The input member is coupled to the variator input through a first biasing device arranged to exert a first biasing force on the variator according to a first, input gain which relates input torque acting on the input member and the first biasing force. The output member is coupled to the variator output through a second biasing device arranged to exert a second biasing force on the variator according to a second, output gain which relates output torque acting on the output member and the second biasing force. The first and second biasing forces clamp the variator to provide traction. The first, input gain and second, output gain are different, which, at least in specific variator applications, optimises the traction coefficient.

24 Claims, 18 Drawing Sheets

(56) References Cited

U.S. PATENT DOCUMENTS

| | | | |
|---|---|---|---|
| 2002/0119862 A1* | 8/2002 | Goto | F16H 15/38 476/73 |
| 2004/0087412 A1* | 5/2004 | Mori | F16H 15/38 476/46 |
| 2004/0171452 A1* | 9/2004 | Miller | B62M 11/04 475/215 |
| 2006/0122028 A1* | 6/2006 | Henzler | F16H 37/086 476/40 |
| 2006/0122029 A1* | 6/2006 | Lautenschlager | F16H 15/38 476/40 |
| 2006/0194669 A1* | 8/2006 | Ruehle | F16H 15/38 476/73 |
| 2007/0284020 A1* | 12/2007 | Harada | C21D 9/00 148/663 |
| 2010/0267510 A1* | 10/2010 | Nichols | F16H 63/067 475/189 |
| 2012/0199217 A1* | 8/2012 | Long | F16H 61/0025 137/468 |
| 2012/0202644 A1 | 8/2012 | Durack | |
| 2013/0053211 A1* | 2/2013 | Fukuda | F16H 15/38 476/10 |
| 2013/0324355 A1* | 12/2013 | Xie | F16H 61/664 476/11 |
| 2013/0338888 A1* | 12/2013 | Long | F16H 61/6649 701/58 |
| 2014/0262672 A1* | 9/2014 | Raszkowski | F16D 11/14 192/69.8 |
| 2016/0001649 A1* | 1/2016 | Benjey | F02B 39/10 477/5 |
| 2019/0040951 A1* | 2/2019 | David | F16H 61/66 |
| 2020/0103007 A1* | 4/2020 | Ajumobi | F16H 15/38 |

FOREIGN PATENT DOCUMENTS

| | | |
|---|---|---|
| WO | 2011051702 | 5/2011 |
| WO | 2013104727 | 7/2013 |
| WO | 2014026238 | 2/2014 |

\* cited by examiner

VARIATORS

FIELD OF THE INVENTION

This invention relates to variators. More specifically, it relates to variators for mechanical transmission systems.

BACKGROUND OF THE INVENTION

In this context, a variator is a transmission component that interconnects two rotatable elements whereby, when rotating, the two elements have rotational speeds related to one another by a ratio (referred to as the "variator ratio") that can vary between a minimum variator ratio and a maximum variator ratio in a substantially stepless manner. A variator typically has an input and output, between which one or more coupling elements are disposed for the transfer of power. Examples of variator input and output include pulleys, in which case, the coupling elements are belts or chains, and races, in which case the coupling elements are rolling elements. The present invention is presented in the context of traction drive variators although it is acknowledged that it may be applied to other variators.

A range of variators are known as "full-toroidal" variators. In a full-toroidal variator, one or more pairs of races rotate about a variator axis. Each race has a working surface, arranged such that the working surfaces face one another in a direction parallel to the variator axis. An annular recess of arcuate cross-section is formed within each working surface coaxial with the variator axis, the working surfaces face one another to form a cavity. In types of full-toroidal variator in which individual rollers span the cavity, the cavity width in the plane of the rolling element is conventionally equal to the diameter of the rolling element (plus the thickness of any layer of traction fluid). The rollers may have a component of tilt about a ratio change axis, this tilt being directly related to the variator ratio. The locus of the tilting roller describes a hypothetical circle offset from the variator axis by a radial distance (the "toroidal radius"). When revolved about the variator axis, this hypothetical circle describes a hypothetical torus, the working surfaces occupying opposite regions of the boundary of the torus. Therefore, the space between the working surfaces of the races is referred to as the "toroidal cavity". The centre of all hypothetical circles describe a circular locus, the plane of which (the "centre plane") is spaced equally between the working surfaces. Several rolling elements are typically provided within the toroidal cavity. Each rolling element has a rolling surface that makes contact with (subject to the discussion below) a respective working surface of the two races. Each rolling element is carried in a respective carriage such that it can rotate with respect to the carriage about a rolling axis upon which the rolling surface is centred.

Rotation of one of the races (called the "input race" in this discussion) with respect to the carriages causes each rolling element to rotate, and this, in turn causes the other race (called the "output race" in this discussion), to rotate in a direction opposite to the rotation of the input race. During such rotation, each rolling element will make contact with the input race and the output race about a respective circular contact locus described on the respective working surfaces. If these two loci are of the same radius (the radius of a locus being generally referred to as the "contact radius"), then output race and the input race will have the same rotational speeds (albeit in opposite directions). However, if the contact radius of the input race (the "input contact radius") is not equal to the contact radius on the output race (the "output contact radius"), then the speed of the output race will be greater than or lesser than the speed of the input race. In general, the variator ratio will be equal to the ratio of the input and output contact radii. The variator ratio is calculated by dividing the variator output speed by its input speed. The "inner contact" is the roller-race contact that is radially nearer the variator axis, and the "outer contact" is the roller-race contact that is radially further from the variator axis. The "input contact" is the contact at the input race while the "output contact" is the contact at the output race.

Each carriage is configured such that the rolling axis can be moved to alter the input and the output contact radii, this movement being referred to as "tilt". A component of the tilt is responsible for the change in contact radii, and this component of the tilt is about the ratio change axis. At least when the variator is operating in an equilibrium condition, the input and the output radii are substantially symmetrically disposed about the toroidal radius.

The foregoing description refers to "contact" between the working surfaces and the rolling elements. However, this is a simplification. Most embodiments of toroidal variators operate using traction drive. That is to say, the working surfaces and rolling elements are at least partially immersed in a traction fluid. This has the property of having a viscosity that increases rapidly when its pressure exceeds a threshold. As the races rotate, traction fluid is drawn into the nips formed between the rolling elements and the working surfaces to create a thin layer of traction fluid between the rolling surfaces and the working surfaces, so there is, literally speaking, no contact between them. In order to achieve a satisfactory traction drive, an end-load is applied, as discussed below. In response to changes in end-load, the races that clamp the rolling elements may move slightly, but not substantially, in a direction parallel to the variator axis.

The "traction coefficient" of a variator is defined as the (i) tangential contact force divided by (ii) the normal contact force. These quantities are defined as follows:
(i) The tangential contact force (that is, parallel to the interface plane of the rolling element and race, and in the rolling direction of the rolling element) arises from fluid shear at the rolling element-race contact. It is proportional to a force acting on each rolling element (termed the "reaction force"), this typically being applied by a roller control actuator. The tangential contact force and roller tilt determine the sum of the absolute values of the variator input and output torques (the sum of these torques being referred to as "reaction torque").
(ii) The normal contact force (that is, the force normal to the rolling element-race interface plane) is generally determined by the clamp load or endload that is applied to the variator.

In the variator in which a single roller is disposed on a carriage between the races (a "single roller variator"), the input and output torques of the same sense act upon the input and output races. The reaction torque is equivalent to the sum of the variator input and output torques, and is also equivalent to the torque reacted into a casing of a variator in which the sign of input and output torque are the same. Proportionality of endload to reaction torque is, with some provisos, an efficient mode of endload control in full toroidal variators since it provides a more-or-less constant traction coefficient. Control of endload based upon reaction torque is therefore regarded as an optimal strategy for full toroidal variators. This can readily be achieved if the roller reaction forces and end-load clamp forces are both generated by a common hydraulic pressure, for example by feeding the same pressure source to roller control and end-load actuators Within the general arrangement of a full-toroidal variator described above, a great many variations are possible concerning control, mounting and freedom-of-movement of the carriages, number and configuration of races, number and configuration of rolling elements, and so on. In one modification to the variator described above, each rolling element is replaced by a train of two rolling elements in contact with one another (a "double roller variator"). Thus, each rolling element is in contact with one working surface and with the other rolling element. It should be noted that in a variator that incorporates this modification, both races turn in the same direction about the variator axis thus providing a positive variator ratio.

The use of the terms "input" and "output" to define the races should not be taken as a functional or structural limitation relating to these components—they are simply used as a convention. The variator may be entirely symmetrical in operation, i.e. power may flow in either direction through the variator. This convention will however be adhered to herein to provide a concise and understandable description in a particular context. For example, in the case of a transmission for a vehicle, the input will typically be connected to a prime mover, and the output will typically be connected to a final drive system to indicate the normal direction of power flowing through the variator. However, it will be understood that when the vehicle is in an overrun condition, engine braking will actually cause power to flow from the output to the input of the variator.

The present invention is especially applicable to many types of rolling contact variator, including full toroidal, half toroidal and ball bearing (for example a Kopp variator) variators.

As previously described, the ratio of the tangential contact (shear) force to normal contact force is termed the "traction coefficient". Traction drives are able to sustain a limiting maximum (sustainable) traction coefficient that is variable, dependent upon the prevailing operating conditions.

It is known that excessive normal contact load, which causes the variator to operate at too low a traction coefficient, may reduce the durability of the rolling surfaces. It also gives rise to higher levels of contact spin loss (this being a power loss that arises due to relative rotation of the components at the region of their contacts in the tangent plane of the contacting surfaces). This reduces efficiency of the variator. It is also the case that insufficient normal contact load can allow the limiting maximum traction coefficient to be exceeded such that gross slip occurs between the rolling elements and race surfaces. It is therefore advantageous to tailor the endload such that the traction coefficient of the contacts is sufficiently high to achieve good efficiency and durability, but sufficiently low to avoid gross slip.

Minimising the end-load offers a particular advantage in single cavity toroidal variators, because these variators typically comprise thrust bearings which must bear the endload, and which also accommodate large differences in speed between input and output races. Such bearings are typically rated according to this differential speed, and also according to the endload that they must bear. Reducing the end-load that the thrust bearings must bear allows the power capacity and/or life of a single cavity variator to be increased. A single cavity variator has particular application to auxiliary drives, especially for Internal Combustion Engines (ICEs) and within this field of use, particular application to supercharger drives which can require significant power to be transmitted by the variator.

Accordingly, in general it may be beneficial to operate near to the maximum traction coefficient of the variator at each operating condition of the variator. However, it may be challenging to achieve this with a simple, conventional end-load arrangement.

A hydraulic endload arrangement can provide a tailored endload and also provide a fast response such that the endload does not lag behind the reaction force during rapid transients. However, a hydraulically actuated variator requires a substantial hydraulic infrastructure (such as high pressure pumps, filtration, and relief valves) which can be costly, bulky or heavy in some applications. Hydraulic systems also consume power, which can reduce overall efficiency of the transmission.

The challenge of optimising traction conditions exists in many different types of rolling contact variator. However, the following description will use the full toroidal variator in order to illustrate the challenges and proposed solutions.

WO-A-2014/026238 discloses a variator that has first and second biasing devices that apply end loading to a variator in response to torque at the input and output of the variator. Although these differ in physical size, calculations reveal that the constants of proportionality relating applied torque to endload (termed here as 'gains') of the first and second devices differ by a negligible amount of no more than 0.5%. This has no material effect on the end loading applied by the biasing devices.

SUMMARY OF THE INVENTION

An aim of this invention is to provide an arrangement for providing a biasing (clamp) end-loading arrangement in a variator that provides as near as possible optimal traction conditions at many operating conditions, and which is not reliant upon a complex hydraulic system to achieve this.

According to an aspect of the invention, there is provided a variator operative to transmit rotary motion between a rotary variator input and a rotary variator output, the variator comprising:

an input member operatively coupled to the variator input and an output member coupled to the variator output;

transfer means disposed in rolling contact with the input and output members to transfer rotary motion between them;

the input member being coupled to the variator input through a first biasing device which serves to transmit rotary motion from one to the other and is arranged to exert a first biasing force which varies with torque acting on the variator input; and the output member being coupled to the variator output through a second biasing device which serves to transmit rotary motion from one to the other and is arranged to exert a second biasing force which varies with the torque acting on the variator output;

the first and second biasing forces both being directed such as to urge the input and output members into engagement with the transfer means to provide traction between them; and the first and second biasing devices each having a respective gain that relates applied torque to generated bias force, wherein the gain of the first device is unequal to the gain of the second device.

By "different" or "unequal", it should be understood that the gain of the first device is substantially different or unequal to the gain of the second device—that is, different or unequal by design, that is more than a difference or unequality that could otherwise arise from typical manufacturing tolerances between examples of notionally identical devices and sufficiently different or unequal in order to have a material effect on the endload applied in response to torque applied at the variator input and output.

Typically, the gains of the first and the second biasing devices may differ by 1% or more, by 10% or more, or by 25% or more. In other words, one of the gains is greater than the other gain by 1% or more, by 10% or more, or by 25% or more. Embodiments of the invention may include biasing devices that have gains differing by greater amounts, in some cases, one gain being twice or more than the other.

Preferably the two biasing forces may act in opposition so that, at any moment (excluding naturally at 'hand-over' i.e. when such forces are equal) one or other dominates and determines the net, or resultant, biasing force applied by the two biasing devices—that is to say, the net, or resultant, biasing force is that applied by the one biasing device that is tending to generate the greater force. The biasing device that is tending to generate the higher end-load force dominates over the other. In such an arrangement, the first biasing device tends to apply a force to the input member and the second biasing device tends to apply a force to the output member.

In further embodiments, the first and second biasing forces are applied to the same one of the input member or the output member. In this arrangement, the biasing forces may act in parallel such that the biasing force applied to the variator may be proportional to the sum of the input and output torque (that is, the reaction torque) and thus a biasing force that closely approximates hydraulic endload is provided mechanically, without the requirement for a high pressure hydraulic system.

Preferably each biasing force is generated in response to the torque transmitted through, respectively, each of the input and output member. The bias force applied by each biasing device may be proportional to the torque acting on the associated one of the input and the output member.

The transfer means may include one or more rolling element. In a toroidal variator the transfer means typically includes at least one roller, and the input and output members may be races with working surfaces in driving engagement with the at least one roller. In such embodiments, typically there are several rollers in driving engagement between the races.

One or both biasing devices may include a cam. The cam may have means for responding to torque applied to the variator mounted adjacent to or integral within one or more of the input member and the output member such that an axial load is generated as a function of, and typically in proportion to, the torque transmitted by that member. The first biasing device may comprise an input cam. The input cam may preferably comprise a first link configured to transmit torque from the variator input through the first link to the input race. Similarly, the second biasing device may comprise an output cam. The output cam may comprise a second link configured to transmit torque from the variator output through the second link to the output race. Suitably, each link may typically comprise low-friction rolling elements that lie on a circumferential ramp provided on the cam, so that the torque and axial endload ($F_{el}$) are related mathematically to the tangent of a ramp's angle and a radius of the rolling elements from the variator axis (typically being the axis about which the races rotate) according to the expression:

$$F_{el} = \frac{T}{\tan(\theta).R}$$

Where:
T is torque applied to a race,
θ is the local ramp angle of the cam, and
R is the radius (distance) of the rolling elements from the variator axis.

If the gain (G), of the or each cam arrangement is given by $$\frac{F_{el}}{T}$$

then $$G = \frac{1}{\tan(\theta).R}$$

The cam may have a first surface coupled to or integral with a rear face of a race and a second surface opposing the first surface, each surface including raceways that form the ramps, these ramps being inclined to the plane of the race and extending simultaneously in an axial and circumferential direction (i.e., helically) substantially about the variator axis. The angle θ is a measure of the ratio that is the distance that the ramp extends in the axial direction per distance that it extends in the circumferential direction. These raceways may form a continuously sweeping plane, or may comprise grooves, such as channels of curved section. The rolling elements located between the first and second surfaces may be rollers, balls or tapered rollers. The ramps may have a fixed or variable angle that increases with increasing angular wind-up of the cam (that is, with increasing torque), and they may further comprise endstops to limit the angular rotation of the cam. A ramp of variable angle results in a variable gain of the input or output biasing device as the roller rolls along the ramp. When such ramps are utilised, a gain range of the input biasing device may be greater than a gain range of the output biasing device, or viceversa. This means that the gain achieved by the input biasing device will be greater, or lower, than that achieved by the output biasing device irrespective of the location of the rollers along the corresponding ramps. In other words, the input and output gain ranges on respectively the input and output biasing devices may be distinct or separated, i.e. not overlapping. The gains of the input and/or output biasing devices are, however, preferably constant, i.e. the corresponding ramps are of constant angle, with the advantage that the gain achieved will not be a function of axial deformation of the variator. Although in preferred embodiments the first and/or second biasing device may comprise a cam or camming arrangement as described hereinabove, alternative arrangements of biasing devices according to embodiments of the present invention are possible which do not include cams. For example, such alternative biasing devices may comprise one or more gears with one or more pressure angles—these gears are distinct from cams since they dispense of any form of cam follower, as the skilled person will readily appreciate. Otherwise, such alternative biasing devices may comprise hydraulic valve arrangements adapted to respond to applied torque through angular wind-up, thus generating hydraulic pressure to act on an end-loading piston.

The endload clamping system may include a spring that operates to set the bias force at a minimum level when no torque appears on the input or the output of the variator. This spring may be functionally in series with the other biasing devices.

In some embodiments of biasing devices, there may be a rotary endstop that is separate from the cam ramp. Preferably the rotary endstop is a mechanical endstop, and comprises one or more regions on the variator input (and/or output) member that contact with one or more regions of the race or part mounted for rotation with the variator race such that rotation of the variator member relative to the race is limited to a pre-determined angle. There may be one or more contacting regions. The contacting region on the variator input or output member may comprise protrusions, such as teeth. The contacting region on the variator race or part mounted for rotation with the variator race may comprise protrusions, such as teeth. The respective teeth or protrusions may overlap in an axial direction whilst being offset or staggered from one another in a circumferential direction. The variator input or output member may comprise a drum that encircles the variator race or part mounted for rotation with the variator race. The drum may comprise protrusions interposed between counterpart protrusions in the variator race or part mounted for rotation with the variator race, the respective protrusions contacting one another when the limit of relative rotary movement is reached. Thus the end-load applied may be limited. Advantageously such a separate rotary endstop can be more easily manufactured to the necessary precision, and multiple contacting regions located around the circumference of the variator members or races may be incorporated, each making contact at a similar rotary wind-up angle of the cam. Such an endstop may not be stressed to a high level because it can include a larger contact area than an endstop that is a part of a cam ramp.

The radius R on the input member may be lower than the radius R on the output member for a given value of θ, or vice versa, as required. Alternatively, R may be kept substantially the same but θ may be varied in order to achieve the desired gains on the first and second biasing devices on the input and output of the variator. It will be appreciated that many possibilities are available.

The endload arrangement may be tailored for particular applications according to the maximum sustainable traction of the variator across a range of different operating conditions. This is in contrast to a conventional variator in which one fixed value of traction coefficient is conventionally set (this may be termed the "design traction coefficient") by, for example, the relative sizes of the roller control and end-load actuators, as described earlier.

There are many possibilities for setting the gains of input and output biasing devices according to embodiments of this invention, depending upon the traction requirements of the application in which the variator is being used.

Consider an application using a full toroidal variator in which a maximum variator input speed is defined, for instance by an engine that has an operating speed at which it delivers a constant maximum power. In this instance, it may be observed that the highest rolling (linear) velocity in the variator is experienced at maximum ratio (over-drive), that is, when the output of the variator is running much faster than the input speed. This is because the rolling speed is the product of the race rotational velocity and the radial distance of the input contact from the variator axis, the latter being maximum at over-drive. The high rolling speed tends to reduce the maximum sustainable traction coefficient of the variator at this condition. Since transmitted power and rolling speed have a significant influence on traction capacity, it becomes apparent that the minimum sustainable traction coefficient may occur at the maximum ratio condition of the variator. Thus, in a conventional, symmetrical clamping arrangement, the design traction coefficient would be dictated by this maximum ratio condition, with the result that the variator would be over-clamped at minimum ratio. One or more of efficiency, durability, bearing life and power capacity may be improved if the traction coefficient was controlled or tailored across an operating envelope of the variator, i.e. subject to particular operating conditions, and for a particular application.

It will therefore be appreciated that, in a system in which the traction conditions towards over-drive ratio are less favourable than those at under-drive over the operating envelope of the variator, it may be advantageous to provide an endload arrangement in which the first, input biasing device has a gain that is greater than the gain of the second, output biasing device because the input device will tend to dominate at this maximum, over-drive ratio. Conversely, it will be appreciated that, in a system in which the traction conditions towards under-drive ratio are less favourable over the operating envelope of the variator, it may be advantageous to provide an end-load arrangement in which the second, output biasing device has a gain that is greater than the gain of the first, input biasing device.

According to another aspect of the present invention, there is provided a transmission for a machine or a vehicle, the transmission comprising a variator as described herein wherein, across the entire operating envelope of the variator, the maximum magnitude of the variator output speed is greater than the maximum magnitude of variator input speed and wherein the gain of the input biasing device is greater than that of the output biasing device.

According to another aspect of the present invention, there is provided a transmission for a machine or a vehicle, the transmission comprising a variator as described herein, wherein across the entire operating envelope of the variator, the maximum magnitude of the variator output speed is less than the maximum magnitude of variator input speed and wherein the gain of the output biasing device is greater than that of the input biasing device.

According to another aspect of the present invention, there is provided a transmission for a machine or a vehicle, the transmission including a variator as described herein, wherein across the entire operating envelope of the variator, the maximum magnitude of rolling speed of the variator at an absolute maximum speed ratio is greater than that at an absolute minimum speed ratio and wherein the gain of the input biasing device is greater than that of the output biasing device.

According to another aspect of the present invention, there is provided a transmission for a machine or a vehicle, the transmission including a variator as described herein, wherein across the entire operating envelope of the variator, the maximum magnitude of rolling speed of the variator at an absolute maximum speed ratio is less than that at an absolute minimum speed ratio and wherein the gain of the output biasing device is greater than that of the input biasing device.

According to another aspect of the invention, there is provided a transmission for a machine or a vehicle, the transmission comprising a variator as described herein, wherein across the entire operating envelope of the variator, the maximum magnitude of transmitted power of the variator at an absolute maximum speed ratio is greater than that at an absolute minimum speed ratio and wherein the gain of the input biasing device is greater than that of the output biasing device.

Such a configuration may be suitable for a variator in a main drive transmission for a vehicle in which the variator input is couplable to an engine and whose output is couplable to the driven wheels of a vehicle. Alternatively such a configuration may be suitable for a variator for driving a positive displacement supercharger.

According to another aspect of the invention, there is provided a transmission for a machine or a vehicle, the transmission comprising a variator as described herein, wherein across the entire operating envelope of the variator, the maximum magnitude of transmitted power of the variator at an absolute maximum speed ratio is less than that at an absolute minimum speed ratio and wherein the gain of the output biasing device is greater than that of the input biasing device.

Such a configuration may be suitable for a supercharger arrangement, and in particular one that includes a dynamic compressor such as centrifugal compressor. Alternatively such a configuration may be suitable for a variator for driving other ancillary devices such as engine auxiliary devices, especially those which benefit from having a lower proportionate speed variation as compared to their driven speed. An example may include an alternator, water pump or oil pump which, by running at a more constant speed than the engine, may provide improved function at low engine speed.

At least in certain embodiments, this invention may provide an effective end-load solution for low cost applications whilst improving efficiency, durability, and power capacity. The solution particularly offers these benefits in single cavity variators and in variators where the numbers of rollers have been minimised for reasons of limiting cost and complexity. Such embodiments may typically include only two rollers per toroidal cavity.

The variator rotary output may be coupled to an energy storage and recovery system, for example one comprising a high speed flywheel that stores energy as rotational kinetic energy.

In some embodiments the variator may comprise rolling elements that are pivoted about an axis passing through their contact regions, such a variator comprising:

an input race and an output race each having a working surface, the races being coaxially mounted for rotation about a variator axis, and a toroidal cavity being defined between the working surfaces;

a plurality of rolling elements disposed between and being in driving engagement with the working surfaces, each rolling element having at least a first contact with a working surface and a second rolling contact, these two contacts defining a pitch axis, each rolling element being mounted on a carriage assembly for rotation about a rolling axis, a radius of a contact region with the working surface being variable with respect to the variator axis in accordance with a ratio of the variator; wherein:

each rolling element is mounted for pivotal movement about the pitch axis;

the variator further comprises a control member operative to actuate the rolling elements to undertake said pivotal movement thereby changing the pitch angle, so urging the carriage assembly to pivot about a tilt axis and thereby provide a change in the variator ratio.

In such a variator, a change of pitch angle of a rolling element (roller) causes the local velocity of the roller relative to the working surface of the race to become misaligned causing the roller to move across the surface of the race such that the carriage is steered to a new tilt angle commensurate with a new variator ratio.

Preferably, the reaction force acting on the carriage assembly is not borne by the actuation point (this being the point at which the carriage assembly is coupled with the control member). This may be achieved by providing a reaction member that reacts the forces separately from the control member. In an especially preferred embodiment, all rollers within the cavity are coupled to the same reaction member. The reaction member is preferably pivotally coupled to the centre of each rolling element.

The reaction member may allow for load balancing between rollers. The reaction member may be adapted for radial movement with respect to the variator axis such that opposing steering is applied to different rollers in the cavity thus causing any difference in rolling element loads to become balanced, and thus equalising the tangential contact forces (that is, shear forces) experienced by different rollers within the cavity. Thus each roller may run at a similar traction coefficient, which increases power capacity and efficiency, and may enable the endload applied to be reduced.

In an especially preferred embodiment, two rollers only are provided in the cavity. A two-carriage geometry provides for equal normal loads to be applied to both rollers. If equal tangential contact forces for the two rolling elements are provided through load balancing then the traction coefficients of the contacts are substantially equal. The assurance that one roller cannot be operating at a higher traction than the other rollers of the same cavity allows endload to be minimised, thus making best use of the tailored endload system according to at least some embodiments. A two-roller arrangement also allows for the carriage assemblies to be actuated one side of a plane that includes the variator axis. In such a configuration simple translational movement of the control member is preferred. The rollers may be actuated simultaneously, and a single control member may be coupled to all carriages within the cavity; this provides for a compact arrangement. Preferably the carriages are coupled to the reaction member so that it bears the load from the rollers within the cavity. The reaction member may move radially so that load balancing is provided by sliding motion of the reaction member. The reaction member may slide along a guide, and the guide may be provided in a variator housing.

Each carriage assembly may comprise one and only one roller (a "single roller variator"), in which case the first and second roller contacts are with the respective working surfaces.

The variator may be of a single-roller type or of the "double roller variator" type in which pairs of rollers are mutually engaged, each pair being disposed between and in driving engagement with the races, each of the rollers in the pair having one race-roller contact and a roller-roller contact. In such a variator the races rotate in the same sense as one another. Each pair of rollers may be mounted on a carriage, the carriage being adapted for rotation about a tilt axis, the tilt axis resulting in a change in race-roller contact radii and correspondingly to a change in variator ratio. The rollers may be mutually inclined such that the contact spin velocity at each roller-race contact is minimised and close to zero when at one variator ratio within the ratio range, this typically being at a ratio of 1.0. Such a variator is described in WO-A-2011/041851.

A toroidal variator, especially a full toroidal variator, typically has a wide range or spread of variator ratios (up to 7 or 8). A tailored end-load system according to at least some of the embodiments described herein that caters for wideranging traction conditions is especially advantageous for a ratio spread of greater than 4, especially greater than 5, more especially greater than 6 and most especially greater than 7.

According to another aspect of the present invention, there is provided a drive system for a vehicle ancillary device comprising a drive input configured to receive drive from a prime mover and a drive output configured to drive an ancillary, the drive system comprising a variator as described herein, the drive input being connected directly or indirectly to the input of the variator and the drive output being connected directly or indirectly to the output of the variator. A particular application of such a drive system is a drive system for a centrifugal supercharger for an internal combustion engine. In this application it is preferable that the output gain of the end-load arrangement is greater than the input gain.

According to another aspect of the present invention, there is provided a transmission for a machine or vehicle including a variator as described herein. Such a transmission may be adapted to be a component of a main drive of a vehicle.

According to another aspect of the present invention, there is provided an energy storage and recovery system in which the output race of a variator as described herein is operatively connected to an energy storage device. Such an energy recovery system typically includes a flywheel.

According to another aspect of the present invention, there is provided a transmission for a machine or a vehicle, the transmission comprising a variator as described herein, the variator being adapted to operate across a variator operating envelope comprising a maximum variator output speed and a maximum variator input speed, wherein across the variator operating envelope, the maximum variator output speed is greater than the maximum variator input speed, and wherein the gain of the first, input biasing device is greater than that of the second, output biasing device.

According to another aspect of the present invention, there is provided a transmission for a machine or a vehicle, the transmission comprising a variator as described herein, the variator being adapted to operate across a variator operating envelope comprising a maximum variator output speed and a maximum variator input speed, wherein across the operating envelope of the variator, the maximum variator output speed is less than the maximum variator input speed and wherein the gain of the second, output biasing device is greater than that of the first, input biasing device.

According to another aspect of the present invention, there is provided a transmission for a machine or a vehicle, the transmission including a variator as described herein, the variator being adapted to operate across a variator operating envelope comprising a maximum rolling speed at an absolute maximum speed ratio and a maximum rolling speed at an absolute minimum speed ratio, wherein across the operating envelope of the variator, the maximum rolling speed of the variator at the absolute maximum speed ratio is greater than that at the absolute minimum speed ratio and wherein the gain of the first, input biasing device is greater than that of the second, output biasing device.

According to another aspect of the present invention, there is provided a transmission for a machine or a vehicle, the transmission including a variator as described herein, the variator being adapted to operate across a variator operating envelope comprising a maximum rolling speed at an absolute maximum speed ratio and a maximum rolling speed at an absolute minimum speed ratio, wherein across the operating envelope of the variator, the maximum rolling speed of the variator at the absolute maximum speed ratio is less than that at the absolute minimum speed ratio and wherein the gain of the second output biasing device is greater than that of the first, input biasing device.

According to another aspect of the invention, there is provided a transmission for a machine or a vehicle, the transmission comprising a variator as described herein, the variator being adapted to operate across a variator operating envelope comprising a maximum transmitted power at an absolute maximum speed ratio and a maximum transmitted power at a minimum speed ratio, wherein across the operating envelope of the variator, the maximum transmitted power of the variator at the absolute maximum speed ratio is greater than that at the absolute minimum speed ratio and wherein the gain of the first, input biasing device is greater than that of the second, output biasing device.

Such a configuration may be suitable where the variator is used in a main drive transmission for a vehicle in which the variator input may be coupled to an engine and whose output may be coupled to the driven wheels of a vehicle. Alternatively, such a configuration may be suitable where the variator is used for driving a positive displacement supercharger.

According to another aspect of the invention, there is provided a transmission for a machine or a vehicle, the transmission comprising a variator as described herein, the variator being adapted to operate across a variator operating envelope comprising a maximum transmitted power at an absolute maximum speed ratio and a maximum transmitted power at an absolute minimum speed ratio, wherein across the operating envelope of the variator, the maximum transmitted power of the variator at the absolute maximum speed ratio is less than that at the absolute minimum speed ratio and wherein the gain of the second, output biasing device is greater than that of the first, input biasing device.

BRIEF DESCRIPTION OF THE DRAWINGS

Embodiments of the invention will now be described in detail with reference to the accompanying drawings in which.

DETAILED DESCRIPTION OF THE INVENTION

Figure 1:
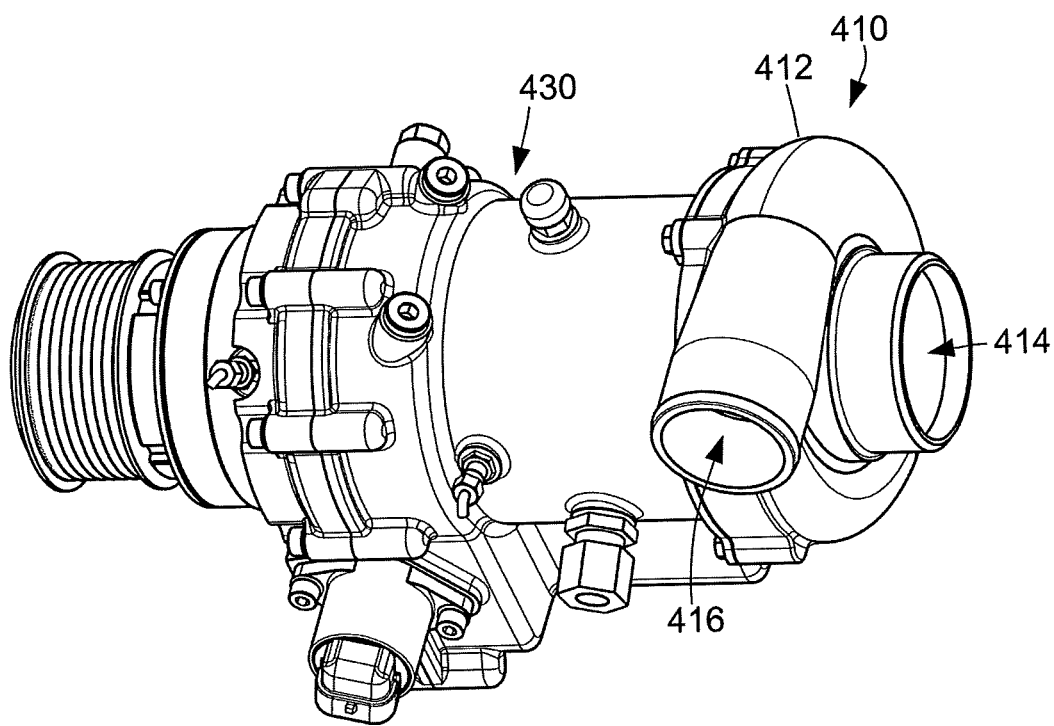
FIG. 1 is a general view of a supercharger assembly according to an embodiment of the invention.

When reading the description of the embodiments, suitable attention should be given to the terminology, explanations and definitions set forth in the introductory part of this specification.

A first embodiment of this invention provides a supercharger assembly, and is intended for use with an internal combustion engine (ICE), as shown with reference to FIGS. 1 to 11.

The supercharger assembly includes a compressor unit 410. This is a self-contained device that is essentially conventional and not a key component of the invention, so it will be described only briefly. The compressor has a compressor housing 412 having an air inlet 414 and an air outlet 416. Within the housing, the compressor includes an impeller 418 that is carried on a compressor shaft 420 fixed for rotation together with the impeller 418.

The compressor unit 410 is secured to a transmission casing 430 such that the compressor shaft 420 projects into the transmission casing 430. In this embodiment, the transmission casing is formed from two interconnected castings, but this is simply for ease of manufacture, and is not germane to the invention.

Within the transmission casing are two principal assemblies: a variator 432 and an epicyclic drive 434. A main shaft 436 of the transmission extends within the transmission casing 430, coaxial with the compressor shaft 420. A tail of the main shaft 436 projects from the transmission casing 430 in an opposite direction to the compressor shaft 420. A drive pulley 438 is carried on the main shaft 436, and is fixed for rotation with it. In a typical application, the drive pulley 438 would be connected through a poly-V belt to a pulley carried on the crankshaft of an internal combustion engine, such that it rotates at a speed that is proportional to the speed of rotation of the crankshaft. The pulley is coupled to the main shaft 436 via a one way clutch device that transmits torque only in a single direction since the centrifugal compressor does not require torque to be transmitted in the reverse sense. This device includes torsional elements that damp disturbances from the engine.

Within the casing, the main shaft 436 is carried on a first set of angular contact bearings 470 that are retained within the transmission casing 430. The bearings 470 retain the main shaft 430 radially and restrict its axial movement in the direction towards the drive pulley 438. A thrust washer 472 is trapped between a flange of the main shaft 436 and the inner race of the bearings 470.

An inner part of the main shaft 436 forms a variator shaft. On it is carried an input race 442 and an output race 444, each of which can rotate freely upon the main shaft 436 about the variator axis V, and which can move axially along the main shaft 436. The races have mutually facing working surfaces 450, 452, between which a toroidal cavity is defined. Within the cavity, there are two rollers 426, 428 in contact with the working surfaces to transmit drive between the input and output races 442, 444.

Figure 4:
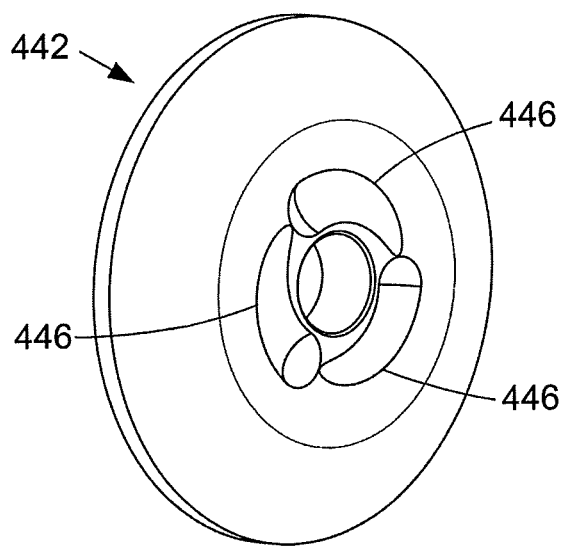
FIG. 4 is a rear oblique view of an input race of the embodiment of FIG. 2.
Figure 5:
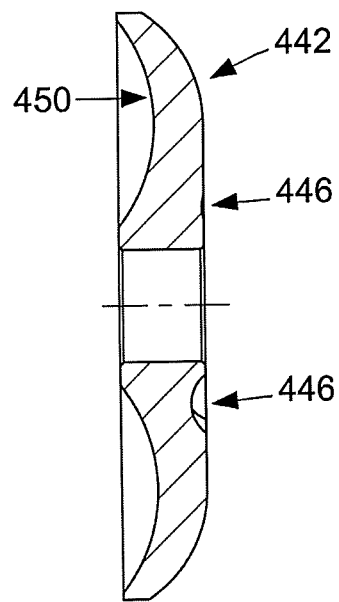
FIG. 5 is a transverse section of an input race of the embodiment of FIG. 2.
Figure 6:
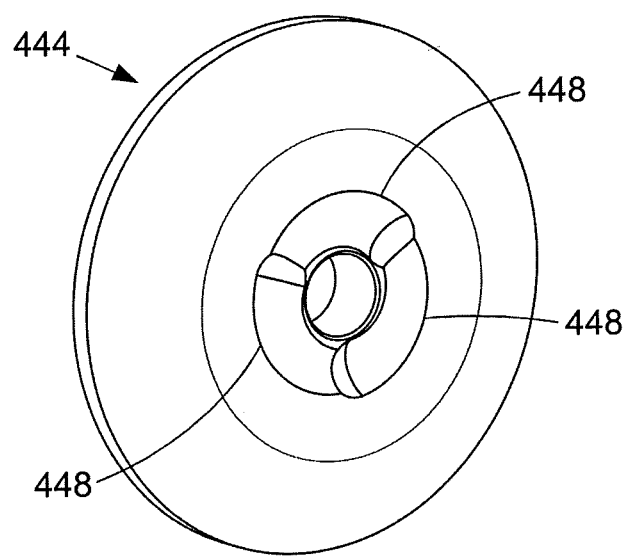
FIG. 6 is a rear oblique view of an output race of the embodiment of FIG. 2.
Figure 7:
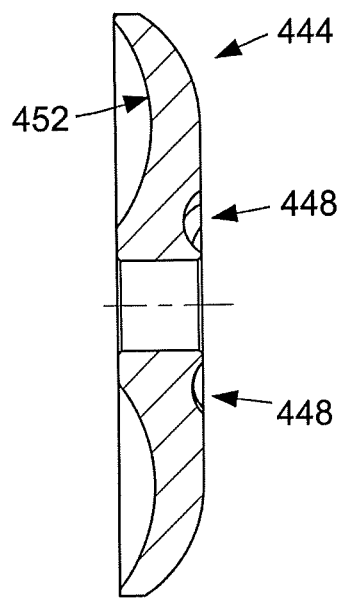
FIG. 7 is a transverse section of an output race of the embodiment of FIG. 2.
Figure 8:
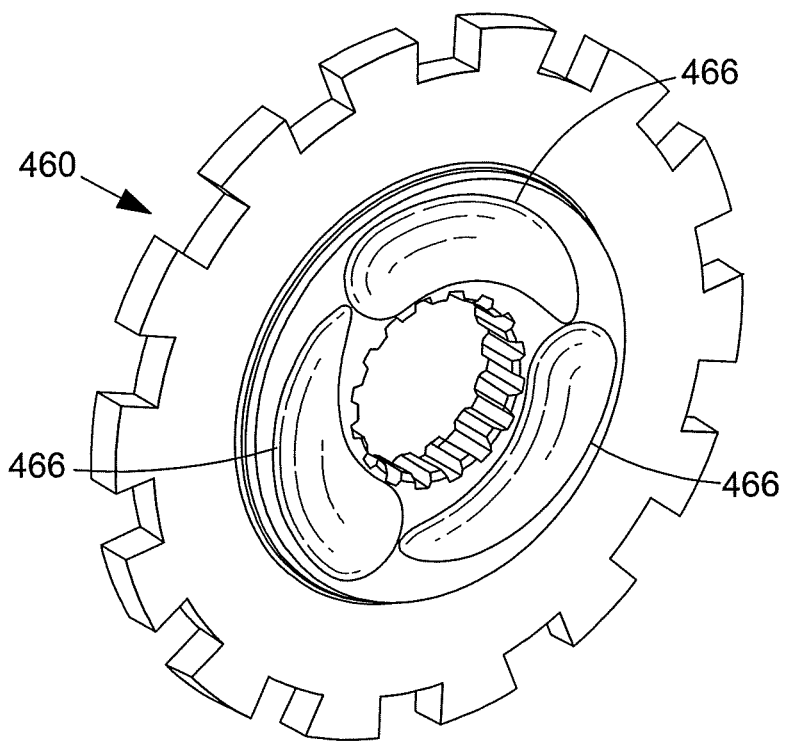
FIGS. 8 and 9 are oblique views of, respectively, an inner and an outer surface of an input drive disc of the embodiment of FIG. 2.
Figure 9:
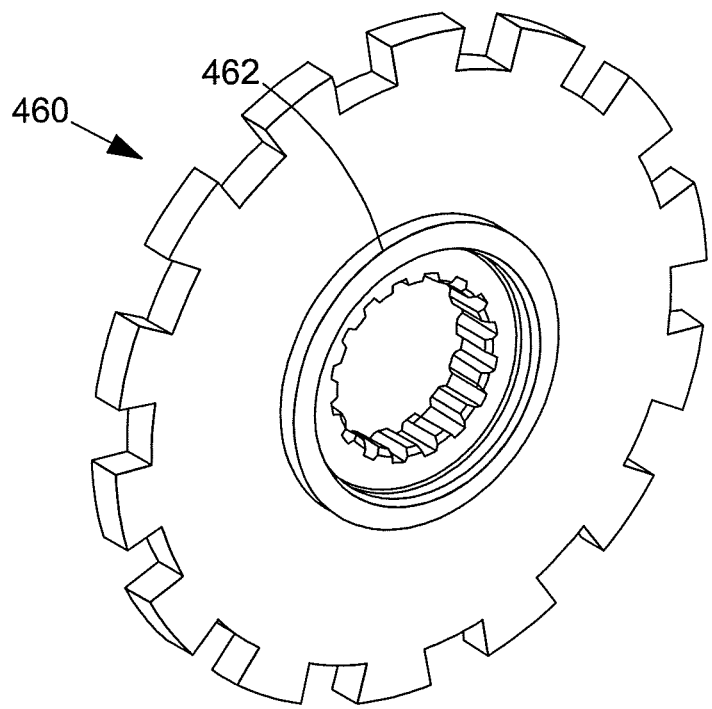
Figure 10:
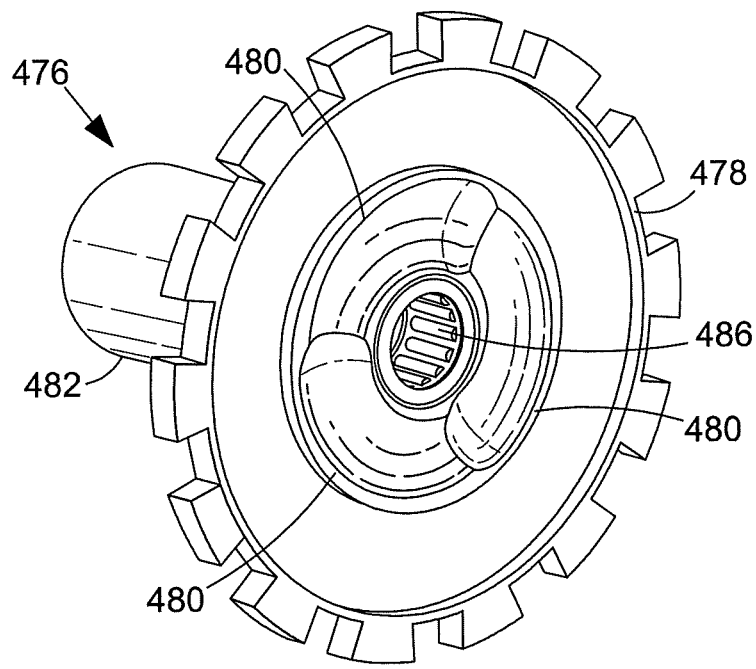
FIGS. 10 and 11 are oblique views of, respectively, an inner and an outer surface of an output drive component of the embodiment of FIG. 2.
Figure 11:
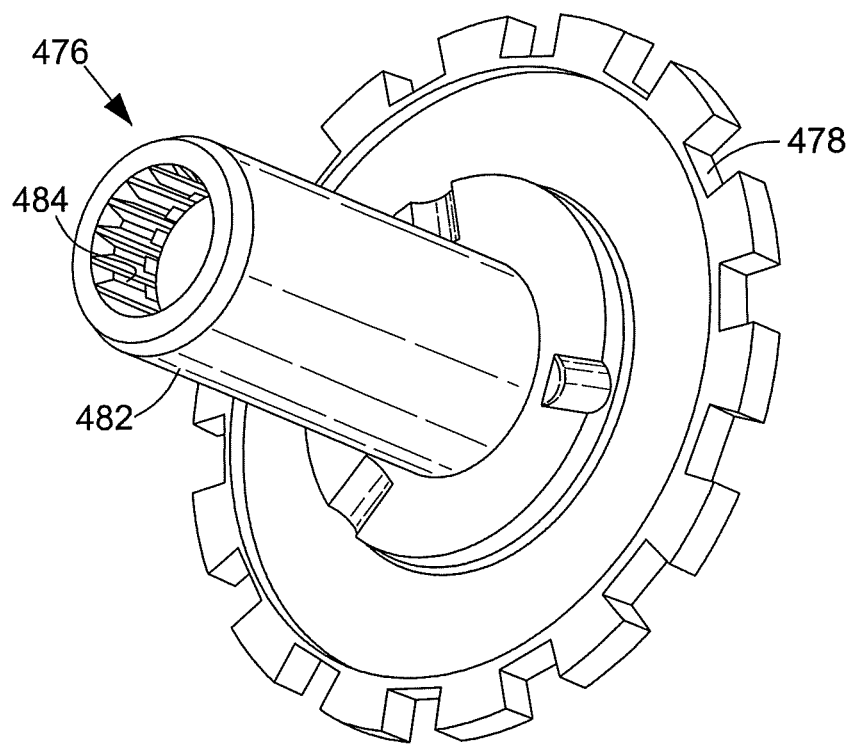

The input race 442 is shown in more detail in FIGS. 4 and 5, and similar detailed views of the output race 444 are shown in FIGS. 6 and 7. On the rear surface of each race 442, 444 three grooves 446, 448 are formed, the grooves of each race extending around a common circular locus. Each groove has an arcuate cross-sectional shape, and varies linearly in depth along its length (that is, the depth varies linearly with angle about the variator axis) in an anti-clockwise direction in the case of the input race 442 and in a clockwise direction in the case of the output race 444.

An input drive disc 460 is carried on the main shaft 436 adjacent to the input race 442. The input drive disc 460 is carried on splines such that it rotates with the main shaft 436. The input drive disc 460 has an outer face on which a projecting annular rib 462 is formed. The rib 462 is surrounded by a stack of disc springs 464 which lie in contact with the outer face of the input drive disc 460 and with the thrust washer 472. The input drive disc 460 has an inner face in which three grooves 466 are formed, the grooves of each race extending around a common circular locus. Each groove has an arcuate cross-sectional shape, and varies linearly in depth along its length (that is, the depth varies linearly with angle about the variator axis) in an anti-clockwise direction. The grooves 466 correspond in radius, circumferential position and depth to the grooves 446 in the input race 442. The radius of the grooves corresponds with the quantity 'R' and the depth of the grooves per unit circumferential position relates to the quantity 'tan(θ)', where θ is the ramp angle as described previously.

Three steel ball bearings 474 are located between the input drive disc 460 and the input race 442, each being located in a respective one of the grooves 446, 466 in the input disc 460 and the input race 442.

An output drive component 476 is carried for rotation on an end portion of the main shaft 436. The output drive component 476 has a drive disc portion 478 from which a hollow cylindrical shaft portion 482 extends. An axial bore extends through the shaft portion 482 and the drive disc portion 478. The drive disc portion 478 has an inner face in which three grooves 480 are formed, the grooves of each race extending around a common circular locus. Each groove 480 has an arcuate cross-sectional shape, and varies linearly in depth along its length (that is, the depth varies linearly with angle about the variator axis) in a clockwise direction. The grooves 480 correspond in radius, circumferential position and depth to the grooves 448 in the output race 444. The radius of the grooves 480 corresponds with the quantity 'R' and the depth of the grooves per unit circumferential position relates to the quantity 'tan(θ)', where θ is the ramp angle as described in the previous description. A portion of the bore within the shaft portion 482 remote from the drive disc portion 478 is formed with splines 484. An opposite end of the bore contains a needle roller bearing 486.

Three steel ball bearings 488 are located between the inner face of the output drive component 476 and the output race 444, each being located in a respective one of the grooves 448, 480 of the output drive component 476 and the output race 444.

The shaft portion 482 is carried in an angular contact bearing 490 within the housing, such that a radially inner region of the drive disc portion 478 makes contact with the inner race of the bearing such that it is free to rotate about the variator axis V, but is constrained against movement in an axial direction towards the compressor unit 410. An end portion of the main shaft enters the bore of the output drive component 476, and is carried for rotation in the needle roller bearing 486. An input of the epicyclic drive 434 is connected to the splines 484 of the bore, whereby the output drive component 476 is coupled for rotation with the input of the epicyclic drive 434.

In this embodiment, the compressor unit 410 is of the centrifugal type, which means that the impeller has to turn at a much higher speed than a typical internal combustion engine. Therefore, the compressor shaft 420 is connected to be driven by the central sun gear of the epicyclic drive, while the input of the epicyclic drive 434 is connected to the annulus to effect a step-up of rotational speed from the output drive component 476 to the input of the compressor unit 410.

When there is no load on the variator—that is, when there is no torque applied to the main shaft 436—an axial preload is maintained by the disc springs 464. The preload is reacted by the first set of angular contact bearings 470, and is applied axially to the input drive disc 460, urging it towards the input race 442. The preload is transmitted through the ball bearings 474 to the input race 442, through the rollers 426, 428 to the output race 444. From the output race 444, the preload passes through the ball bearings 488 to the output component 476, where it is reacted by the angular contact bearing 490. In this unloaded condition, an effect of the preload is to cause the races 442, 444 to rotate to allow all of the ball bearings 474, 488 to occupy the deepest part of their respective grooves 446, 448.

A torque applied to the main shaft 436 is transmitted to the input drive disc 460, and is reacted through the ball bearings 474 to the input race 442. The ball bearings 474 will allow the input drive disc 460 to rotate with respect to the input race 442 by rolling within their respective grooves 446, 448. As the ball bearings 474 roll within the grooves, the depth of the grooves 446, 448 in the region of the ball bearings 474 decreases, whereby the ball bearings 474 urge the input race 442 away from the input drive disc 460, thereby creating an increasing endload on the input race 442. Contact between the input drive disc 460 and the ball bearings 474, and between the ball bearings 474 and the input race 442 occurs at the bases of the respective grooves 446, 448, which are each angled with respect to the centre plane of the variator at an angle $\theta_i$ to act as a cam. The ball bearings 474 are located in their grooves 446, 448 at a distance $R_i$ from the variator axis. Thus, the force applied by the ball bearings 474 to the input race 442 can be resolved into two components—a tangential component that applies a torque to the input race 442 and an axial component that applies an endload $F_{el_i}$ to the input race 442. If the torque applied to the input is $T_i$, then: $F_{el_i} = G_i T_i$ where $G_i$ is termed the "input gain", and is given by:

$$G_i = \frac{1}{Ri \tan \theta_i}.$$

A similar situation arises at the output of the variator 432 where the output race 444 transmits torque to the output drive component 476. In that case, the grooves 448, 466 are angled with respect to the centre plane of the variator at an angle $\theta_o$. The ball bearings 474 are located in their grooves 448, 466 at a distance $R_o$ from the variator axis. Thus, where the output torque is $T_o$, the endload force $F_{el_o}$ applied by the ball bearings 488 to the output race 444 is $F_{el_o} = G_o T_o$ where $G_o$ is termed the "output gain", and is given by:

$$G_o = \frac{1}{R_o \tan \theta_o}.$$

The pre-load disc springs 464 have an installed pre-load force $F_{spring}$.

Figure 3:
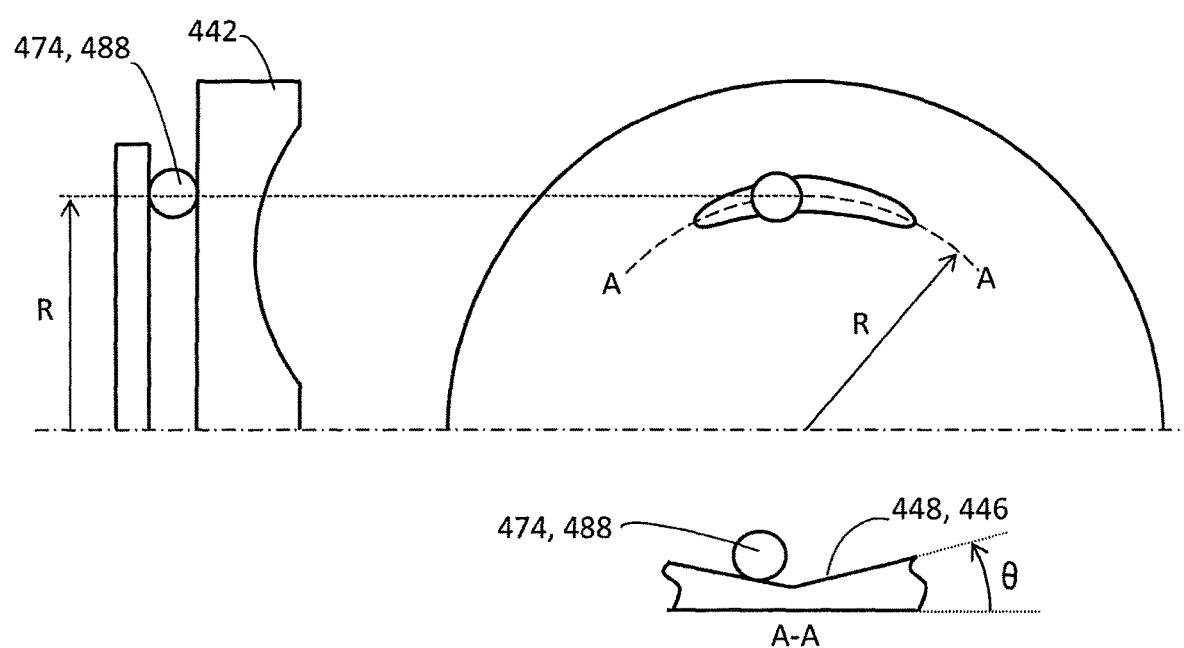
FIG. 3 is a schematic diagram representing parameters which may affect the gain of a biasing device according to an embodiment of the invention.

With reference to FIG. 3, the ball 474, 488 is located at a radial distance 'R' from the rotational axis of a variator disc 442 with which said ball is engaged. The ball sits on a circumferential groove which also extends in the axial direction thus forming a ramp 448, 446, as previously described. The ramp 448, 446 is inclined to the plane of the disc 442 by angle theta (θ). As described previously, end load $F_{el}$ and torque transmitted by this biasing device are related by the expression:

$$F_{el} = \frac{T}{\tan(\theta).R}$$

The ball 474, 488 may alternatively be a roller, such as a cylindrical or tapered roller.

In each case, the ball bearings 474, 488 are constrained to move within their respective grooves 446, 448. Therefore the ball bearings 474 will not allow the input drive disc 460 to rotate further with respect to the input race 442 once the ball bearings 474 reach the end of their grooves 446 (and the same applies on the output side of the variator). Thus, the ends of the grooves 446, 448 act as end stops that limit rotational movement between the input drive disc 460 and the input race 442, and between the output race 444 and the output drive component 476. The grooves 446, 448 extend in a single circumferential direction only so that the variator is adapted to transmit torque only in a drive sense since the centrifugal compressor does not require torque to be transmitted in the reverse direction. In other applications, such as a positive displacement supercharger, the grooves 446, 448 may extend from the root of a vee in two circumferential directions so that torque may be transmitted in both senses.

In this described embodiment, the arrangement is configured such that the net endload $F_{el}$ that is applied to the variator is $\max(|F_{el_i}|,|F_{el_o}|,F_{spring})$. That is, the net endload is always the larger of the generated input endload, generated output endload and pre-load disc spring 464 because the maximum generated endload dominates.

Note that when $F_{el,i}$ or $F_{el,o}$ exceeds the preload force applied by the springs 464, the annular rib 462 comes into contact with the thrust washer 472, and the endload is determined by the variator torques only rather than the disc springs 464.

It will be recalled that traction coefficient is the ratio of contact tangential (shear) force to normal contact force, that is $$\text{Traction coefficient} = \frac{F_t}{F_N},$$

where $F_N$ is approximately proportional to endload $F_{el}$ and $F_t$ is approximately proportional to torque T for a given roller tilt angle or ratio. In other words:

$$\text{Traction coefficient} \sim \frac{T}{F_{el}}.$$

However, it is also noted that the gain of the input and output biasing devices, $$\text{Gain, } G_{i,o} = \frac{F_{el\_i,o}}{T_{i,o}}.$$

Therefore there is an inverse relationship between traction coefficient and endload (biasing device) gain.

As it is generally beneficial for efficiency and durability for the operating traction coefficient to be close to the maximum traction coefficient, the endload arrangement may be configured such that the gain of the dominant biasing device results in an operating traction coefficient that is close to, but that does not exceed, the maximum traction coefficient at the majority of variator operating conditions. As maximum traction coefficient typically falls with increasing power and rolling speed, so the endload gain should ideally be increased with increasing power and rolling speed.

Figure 2:
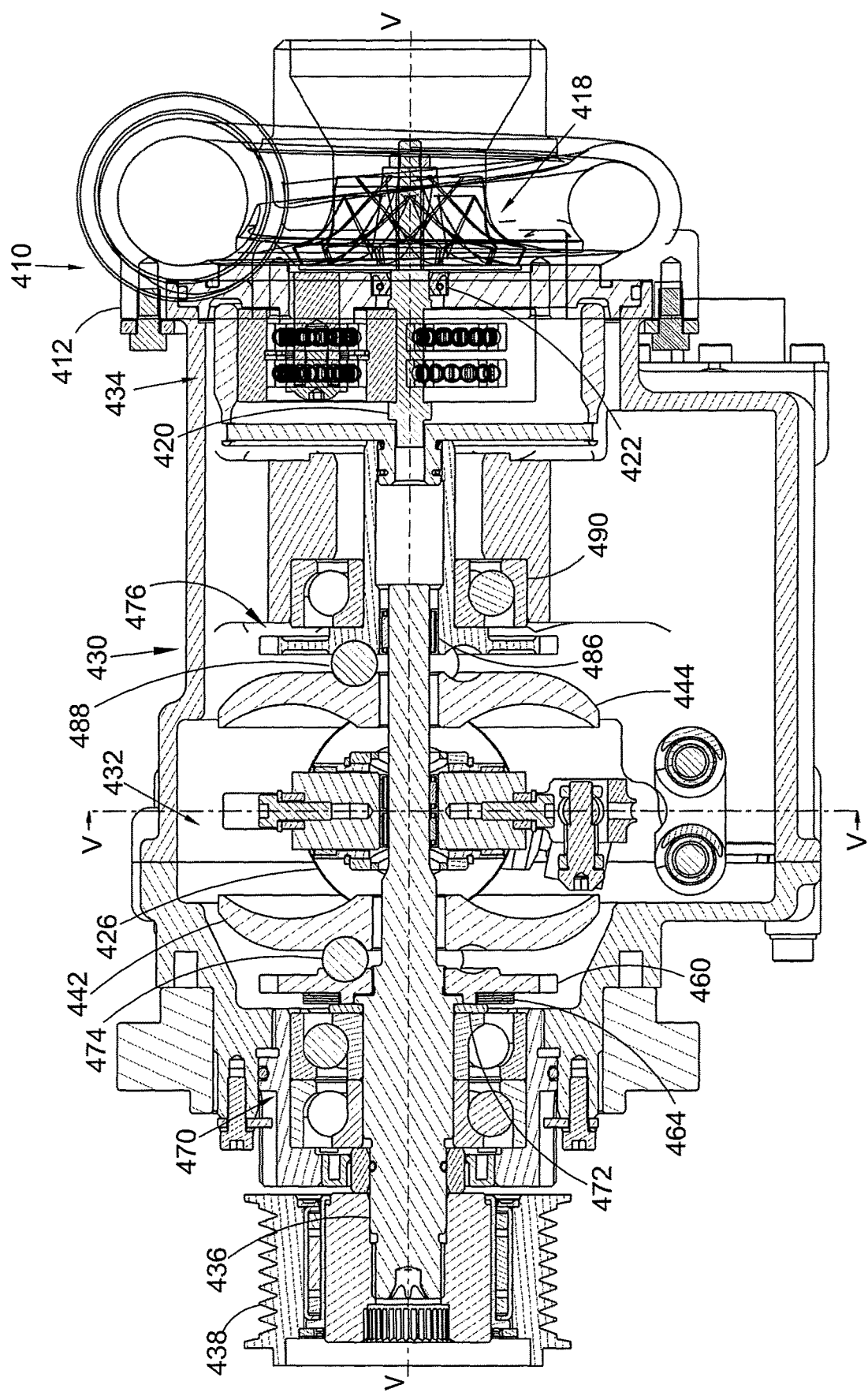
FIG. 2 is a longitudinal cross-section along a variator axis of the supercharger assembly of FIG. 1.

The example application of a supercharger, such as for example a variable speed supercharger, that includes a variator according to an embodiment of this invention and a centrifugal compressor (as shown in FIGS. 1 to 3) will now be described. A centrifugal variable speed supercharger allows the compressor speed to be controlled independently of engine speed. High boost pressures (and therefore engine torque) may therefore be achieved at low engine speeds, with reduced supercharger power consumption at high engine speeds. The compressor speed is advantageously regulated by the variator to produce the required boost pressure. The use of a variator with a wide ratio spread such as a toroidal variator, especially a full toroidal variator, provides great flexibility regarding the control of impeller speed. A wide ratio spread is especially beneficial where the engine speed varies widely, such as in a gasoline engine.

Maximum variator power is transmitted when the power required to pump air is highest. For a given target boost pressure, this occurs when the mass air flow to the engine manifold is highest, this being at maximum engine speed. However, if the compressor speed is held constant to create a constant compressor pressure ratio then the variator must shift to a lower ratio as engine speed increases. Hence, maximum variator power occurs towards minimum ratio in this application. Since the output disc speed is constant whilst the ratio sweeps, the contact rolling speed also increases towards minimum ratio. Due to the dependence of maximum traction coefficient on power and rolling speed, a lower maximum traction coefficient is available at minimum operating ratio than at maximum ratio. An equal gain endload system is not ideal because the traction requirements are asymmetric with ratio. Indeed, if an equal endload gain arrangement were used then it would need to be configured for the low-ratio (lower maimum traction capacity) case, with the result that end-load would then be excessive at high-ratio. It is therefore advantageous if the endload gain is reduced towards the maximum ratio condition so that the variator is not over-clamped at this ratio as over-clamping can lead to poor efficiency and durability of the variator.

It is also important to note which of the biasing devices described above in the form of cams formed between the input and output races 442, 444 and input and output drive discs, respectively, will dominate at particular ratios of the variator. Since the output torque is higher than the input torque towards minimum ratio, the output end-load biasing device will tend to dominate over the input biasing device towards minimum ratio. In the case of the variable speed centrifugal supercharger, it has also been established that a higher gain is preferable towards minimum ratio. Thus the preferable configuration is one in which the gain on the output biasing device is higher than that on the input biasing device, this device reducing operating traction coefficient towards minimum ratio and also becoming dominant towards minimum ratio.

In order to achieve an output gain that is greater than the input gain, the values of $R_i$ and $R_o$ may be chosen such that $R_o < R_i$, with the ramp angles $\theta_i$ and $\theta_o$ being approximately equal. In the case of a centrifugal supercharger drive, the difference may be as much as $R_o \approx 0.5 R_i$ for given ramp angles, thus generating an output gain that is twice that of the input gain. In the embodiment of FIGS. 1-3 however the higher output gain is achieved by forming grooves 448, 480 on the output race 444 and output drive component 476 with a shallower ramp angle $\theta_o$ than the ramp angle $\theta_i$ of the grooves 446, 466 on the input race 442 and input drive disc 460. In each case, the ramp angle $\theta$ required can be calculated from the radial distance of the ramp (R) from the variator axis and the required gain (G):

$$\theta_i = \arctan\left(\frac{1}{G_i \cdot R_i}\right), \quad \theta_o = \arctan\left(\frac{1}{G_o \cdot R_o}\right),$$

where subscripts 'i' and 'o' denote input and output ball and ramp mechanisms respectively.

Conversely, in application in which an input gain larger than the output gain is sought, either a ramp angle $\theta_i$ that is shallower than $\theta_o$ with equal radii $R_i$ and $R_o$, or alternatively a radius $R_i$ that is smaller than $R_o$ with equal ramp angles $\theta_i$ than $\theta_o$ may be provided. Any alternative suitable combinations of R and $\theta$ may be provided.

Figure 12:
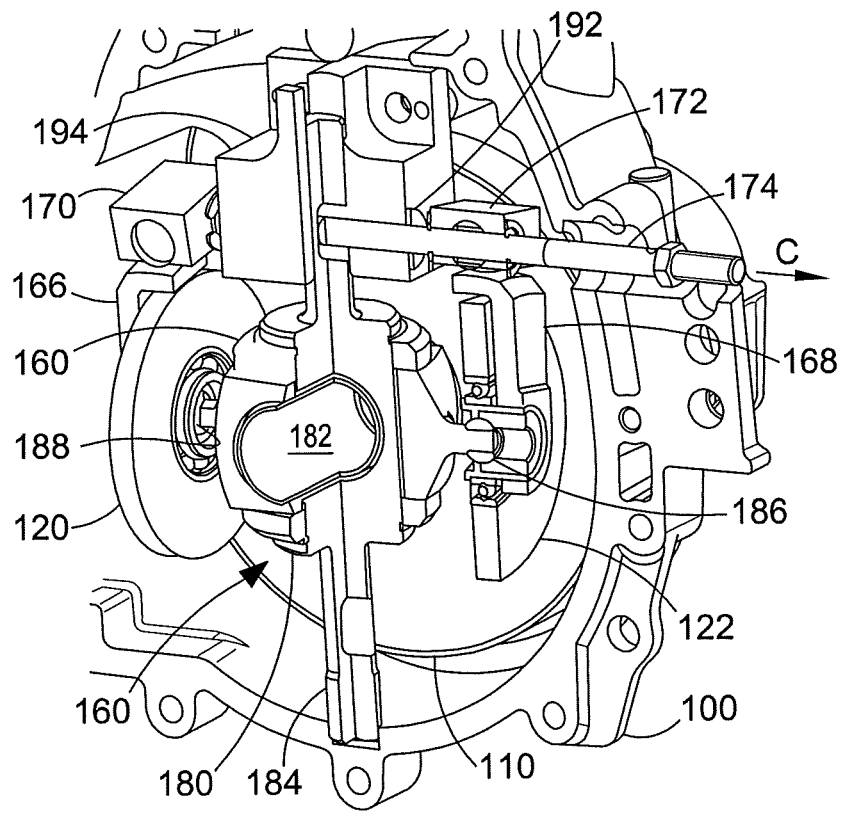
FIGS. 12 and 13 are perspective and part cut-away views of part of a variator according to an embodiment of the invention.
Figure 13:
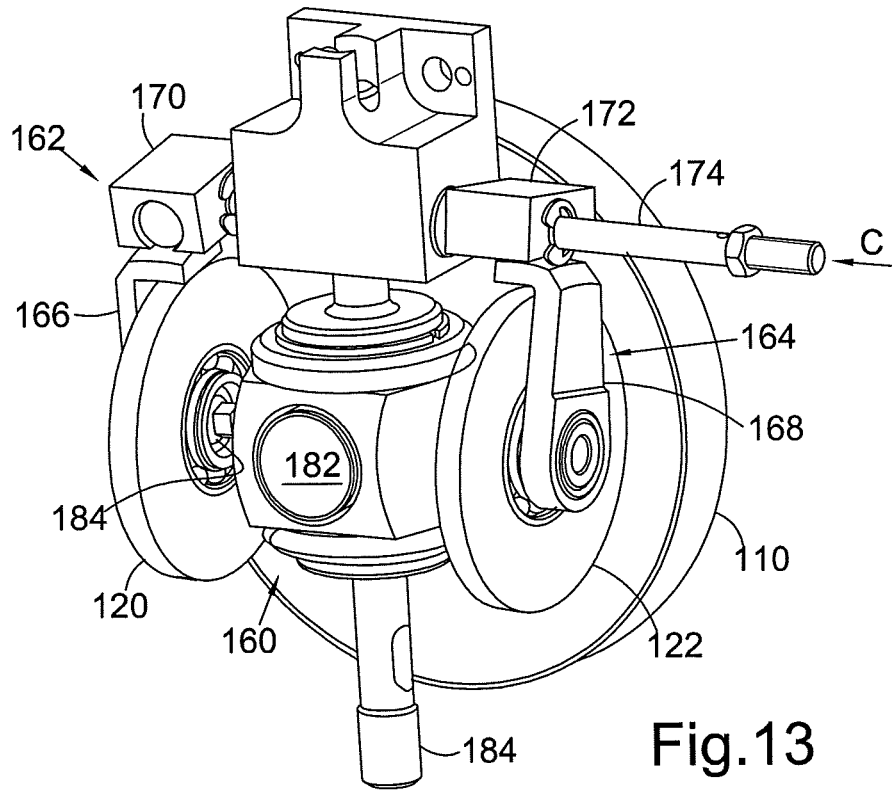
Figure 14:
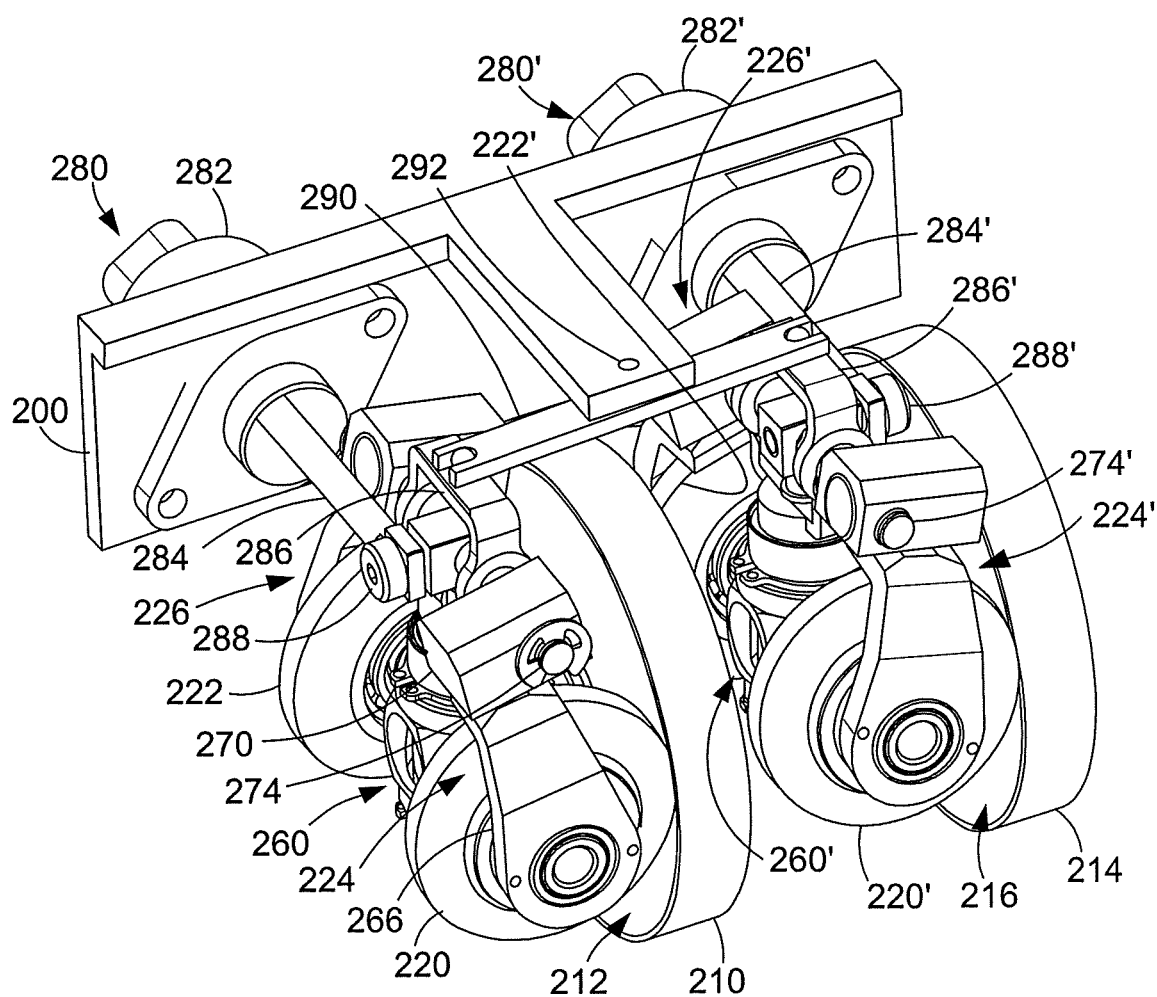
FIG. 14 is a perspective view of part of a variator according to another embodiment of the invention having twin cavities with a load sharing assembly for balancing reaction torque between the cavities.

In FIGS. 12-14, the mechanical endload clamping mechanism which is part of a variator embodying the invention is not always shown for clarity of illustration. Each of these variators comprises a respective mechanical endload clamping arrangement on each of an input and an output member, that apply an endload that is proportional or otherwise increases with the torque applied to the associated input or output member. Each endload clamping arrangement has an associated gain, the gains of the endload clamping arrangements being substantially different (i.e. unequal) to one another. Advantageously, each embodiment includes only low power roller control actuation, as well as a torque-responding mechanical endload system that approximates a hydraulic endload system albeit with clamp characteristics tailored for prevailing operating conditions. Thus the overall solution is low cost and yet may be durable and efficient, hence suitable for a variety of applications such as for a main drive CVT, engine ancillary, variable speed supercharger or for an energy storage and recovery system.

For any application in which an embodiment of the invention is employed, the input gain may be greater than the output gain or the output gain may be greater than the input gain. However, as described herein, each application should preferably be configured in one or other of these ways.

The variator of FIGS. 1 to 3 and 12 to 14 is controlled by the mechanism disclosed in WO-A-2013104727 in which the rollers pivot about a pitch axis causing the rollers to tilt to a new ratio. In these embodiments each roller is caused to undergo pivotal movement about a pitch axis, this pitch axis passing through the contact regions between the roller and the races, thus causing each roller to steer to a new tilt (ratio) angle. The tilt angle defines the relative radii of input and output contacts from the variator axis, the ratio of these two radii generally defining the ratio. There is an equilibrium tilt angle for any given pitch angle since the roller is constrained to precess about a 'castor axis' that is inclined to the plane of the races by an angle known as the castor angle. The castor angle may be generated by a carriage actuation point that is offset to the mid-plane of the variator cavity. Alternatively the rollers may be mounted on a gimbal with a pivot that allows the roller to tilt to change the ratio, the angle between the pivot axis and the plane of the races defining the castor angle.

The variator in FIGS. 12 and 13 includes a reaction member 160 operatively coupled to the rollers 120, 122 that transmit drive between the input race 110 and the output race (not shown). The purpose of the reaction member is to bear reaction torque from the rollers 120, 122. The rollers 120, 122 are mounted on carriage assemblies 162, 164. Each carriage assembly comprises a carrier 166, 168 and a mounting part 170, 172. Each roller 120, 122 is carried for rotation about its rolling axis on a respective carrier 166, 168. Each carrier 166, 168 is pivotally connected to (and actuated by) the respective mounting part 170, 172.

Each mounting part 170, 172 is carried on an elongate control member 174, such that it is prevented from linear movement along the control member 174. Each mounting part 170, 172 is offset from the centre plane of the toroidal cavity in a direction parallel to the variator axis, this offset defining a caster angle ($\alpha$) for each roller. The control member 174 may move in a linear, reciprocal manner in direction C, causing the mounting parts 170, 172 also to move in direction C. Such movement causes the rollers 120, 122 to pivot about their respective pitch axes which causes them to tilt to a new tilt (that is, ratio) angle. Each carriage assembly is located within the toroidal cavity by four points: by its respective mounting part 170, 172, by a reaction point at the centre of the roller 120, 122, and by the two roller contacts (one with each of the output and input race 110). The reaction torque is borne by the reaction member 160 and not by the control member 174, thus reducing friction in the control mechanism and allowing a low force and/or power actuator.

The reaction member 160 comprises a body 180 having an aperture 182 through which a variator input shaft and/or output shaft (not shown) may pass. Reaction shaft 184, projects coaxially and in opposite directions from the body 180 and are aligned normal to the variator axis within the centre plane of the variator. End portions of the reaction shafts 184 are retained in guides formed, respectively, in a casing 100 of the variator and a mounting block 194 secured to the casing 100. The guides allow the reaction member 160 to slide in a radial direction, perpendicular to the variator axis, thus causing the rollers 120, 122 to precess in opposite senses when the reaction member 160 move in response to an imbalance of roller 120, 122 reaction forces. Thus this radial movement serves to equalise the loads of the rollers 120, 122 within the cavity. Advantageously this helps the rollers run at similar traction coefficients to one another, thus allowing lower clamp loads to be applied.

The reaction member 160 is operatively linked to the centre of each roller 120, 122 by a spherical joint 186, 188 so as to transmit the reaction torque from the rollers 120, 122 to the reaction member 160 and to allow for relative pivotal movement between the rollers 120, 122 and the reaction member 160. The control member 174 passes through the reaction member 160 at an aperture 192 but is not linked to it. There is suitably sufficient clearance between the control member 174 and the aperture 192 to avoid fouling as reaction torque is borne and the reaction member 160 moves radially for the balancing of the roller loads within the cavity.

The reaction member 160 may include a damper to dampen movement of the body 180 for example in a radial direction relative to the variator axis. A mechanical end stop may be provided to limit movement of the reaction member 160 in a radial direction relative to the variator axis.

FIG. 14 shows a part of a twin-cavity variator embodying the invention. The variator comprises an input race 210 and similar first and second output races 214 (only one is shown) disposed, in the direction of the variator axis, to opposite sides of the input race 210. Each output race 214 has a working surface 216 that faces the input race 210. The input race 210 has first and second working surfaces 212 that face, respectively, the first and second output races 214. Therefore, two toroidal cavities are defined, a first between the input race 210 and the first output race 214, and a second between the input race 210 and the second output race.

A first set of rollers 220, 222 is provided within the first toroidal cavity to transmit drive between the input race 210 and the first output race, and a second set of rollers 220', 222' is provided within the second toroidal cavity to transmit drive between the input race 210 and the second output race 214. Each roller 220, 222; 220', 222' is mounted on a respective carriage assembly 224, 226; 224' 226'. Each carriage assembly comprises a carrier 266 and a mounting part 270. The roller 220 is mounted for rotation on the carrier 266. The carrier is connected to the mounting part 270 such that it is free to undergo a tilting motion to change the tilt angle of the rollers 220, 222; 220', 222' and thereby change the variator ratio. Each mounting part 270 is offset from the toroidal cavity centre plane such that a castor angle is generated.

A respective electric stepper motor actuator 280, 280' is associated with each cavity. Each actuator 280, 280' comprises a body 282, 282' that is fixed to a casing 200 of the variator, and an actuator rod 284, 284' that can be driven linearly into or out of the body 282.

Within each cavity, the mounting parts 270 of the two carriage assemblies are 224, 226; 224' 226' are connected to a common control rod 274, 274', such that they are fixed to the control rod against linear movement. Each control rod 274, 274' is connected to a respective actuator rod 284, 284' through joint 288, 288' that admits pivotal movement between the control rod and the actuator rod. Thus, operation of the actuators 284, 284' causes linear movement of the control rods 274, 274', and therefore pitching movement of the carriage assemblies 224, 226; 224' 226'.

Each cavity has a reaction member 260, 260' to which the rollers 220, 222; 220', 222' are operatively coupled by spherical joints such that the reaction members bear reaction loads arising from the respective rollers. The reaction members 260 are each slideably mounted on a column which itself is mounted for rotation about the variator axis. The reaction members 260, 260' are operatively linked by a load-sharing assembly. The load-sharing assembly comprises a bar 290 mounted to the casing 286 by a pivot 292. The bar 290 is pivotally connected to the yokes 286, 286' symmetrically about the pivot 292. Therefore, an equal force is applied to each reaction member through its yoke, which ensures that an equal reaction torque 220, 222; 220', 222' in the two toroidal cavities.

Turning again to FIGS. 1 and 2 which show a single cavity embodiment of a variator in which pitching of each carriage causes each roller to steer to a new tilt angle. In this embodiment, the reaction member may also move radially with respect to the variator axis for the balancing of roller reaction forces within the cavity. However, the reaction member is also mounted for rotation about the variator axis in response to reaction torque. In this embodiment the reaction member is a collar that is slideably mounted on a column. The column may rotate about the variator axis against pre-loaded springs when the reaction torque exceeds a threshold value. Rotation of the column causes the rollers to pitch, this causing the variator to downshift in response to excess reaction torque. Such a system is thus configured to limit the reaction torque in the variator.

Figure 15:
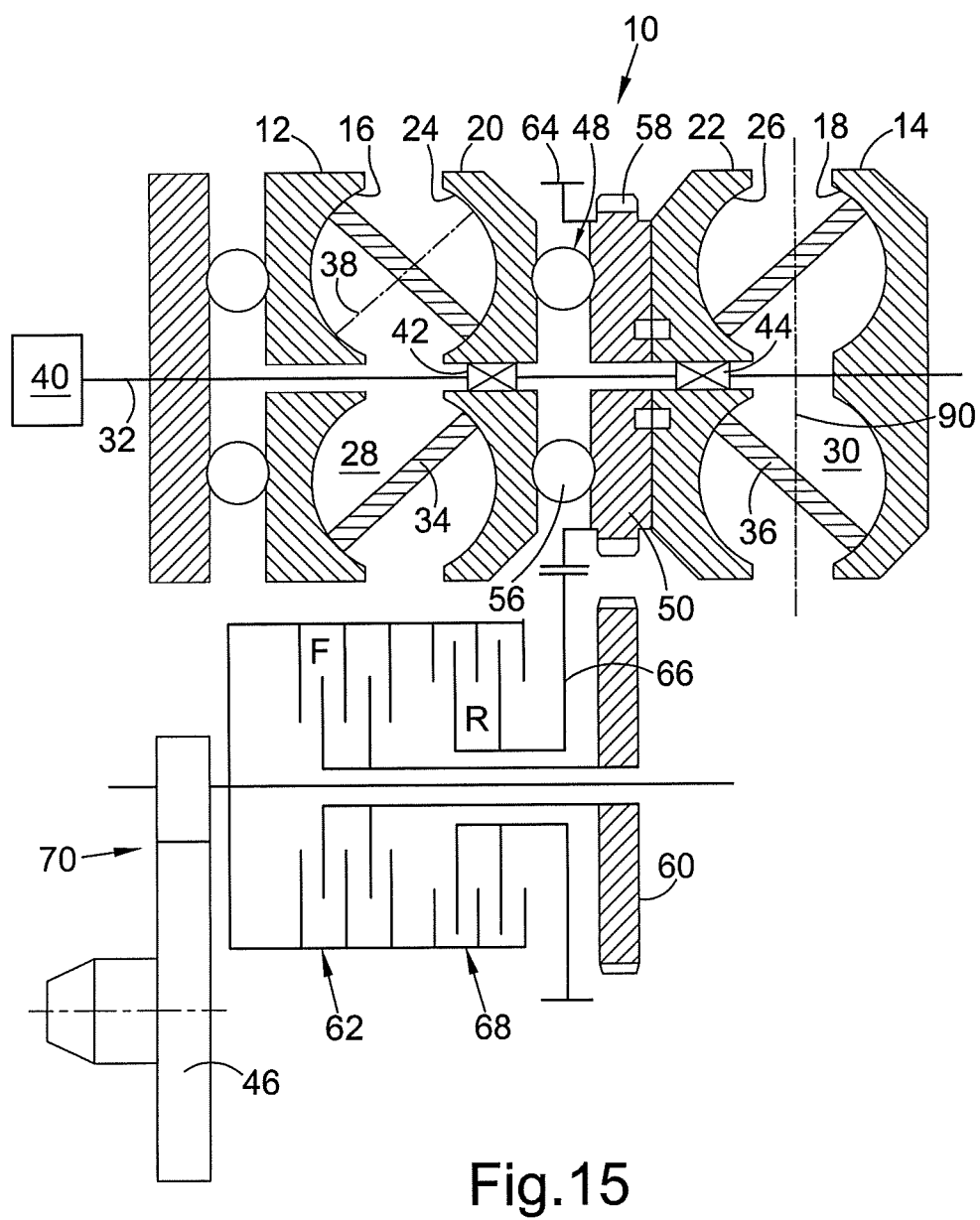
FIG. 15 shows a main drive CVT comprising a variator according to an embodiment of the invention.

The variator 10 represented in FIG. 15 is applied to a main drive continuously variable transmission (CVT) application for a vehicle. The variator 10 is of twin cavity, full toroidal type and has a rolling element control mechanism (not shown) as described herein or as in any one of the variators illustrated in any of the preceding Figures. It has first and second input races 12, 14 having respective faces 16, 18 which are semi-toroidally recessed. Between the input races are first and second output races 20, 22, and these too have respective semi-toroidally recessed faces 24, 26, so that between the first input and output races 12, 20 is formed a first toroidal cavity 28, and between the second input and output races 22, 14 is formed a second toroidal cavity 30. The races have a common rotational axis defined by a main shaft schematically indicated at 32 about which they rotate.

Each cavity 28, 30 contains a respective set of rollers 34, 36. Each roller is mounted for rotation about a roller axis such as 38 and runs upon the toroidal faces of its associated input and output races to transfer drive from one to the other. The main shaft 32 serves as the rotary input to the variator, and is coupled (either directly or through intermediate gearing, not shown) to a rotary driver such as an engine, which in this particular embodiment takes the form of an internal combustion engine schematically represented at 40. The invention could equally well be implemented using a different type of rotary driver such as an electric motor, an external combustion engine etc. The input races 12, 14 of the variator are secured to the main shaft 32 so that they rotate along with it, and so are driven by the engine 40. The output races 20, 22 are able to rotate relative to the main shaft 32. In the illustrated embodiment this is provided for by means of roller bearings 42, 44 through which the output races are respectively mounted upon the main shaft 32. Drive is transmitted from the input races 12, 14 to the output races 20, 22 (or vice versa, in an "over-run" condition) through the rollers 34, 36 at variable drive ratio. The output races 20, 22 are able to be operatively coupled to a final drive 46 leading to the vehicle wheels.

In the illustrated variator 10 traction load is provided by means of a mechanical (non-hydraulic) traction loading device 48 which serves to bias the variator races 12, 14, 16, 18 into engagement with the variator rollers 34, 36 with a force (the "traction load" or end load) which is proportional to the maximum of the input or output torque of the variator multiplied by a respective gain. It does so by urging the two innermost races (which in the illustrated embodiment are the output races 20, 22) away from each other and/or the outermost races (which in the illustrated embodiment are the input races 12, 14) towards each other. The traction load (end load) is transmitted through the rollers 34, 36 to the outermost races, which in the present embodiment are the input races 12, 14, and these in turn refer the force to the main shaft 32, which is thus placed in tension. By referring the traction load to the main shaft 32 in this way, any need for thrust bearings to withstand the traction load is avoided.

The traction loading device 48 uses a simple ramp arrangement to transmit the output torque, and this ramp arrangement creates a traction load along the axial direction which is a function of (and more specifically, in the present embodiment, proportional to) the torque transmitted, with a constant of proportionality being a gain G.

Figure 16:
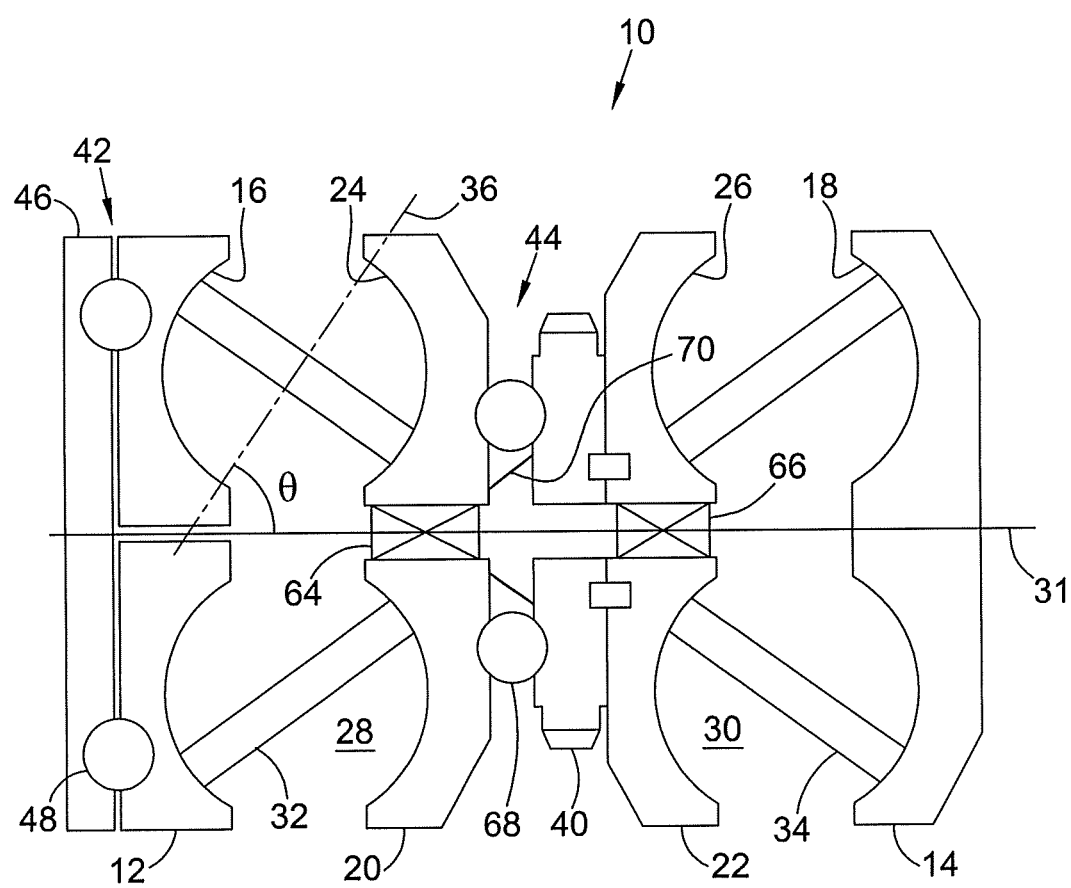
FIG. 16 shows a variator according to another embodiment of the invention in which the mechanical endload clamping system is applied to an input race and an output race wherein the output gain is greater than the input gain.
Figure 16A:
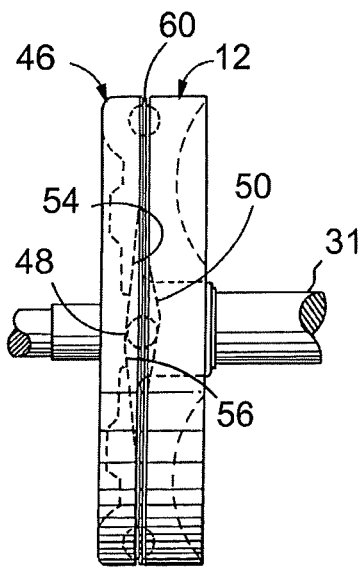
FIGS. 16a to 16e show various components of the variator of FIG. 16.

The variator 10 represented in FIG. 16 is of twin cavity, full toroidal type and has a rolling element control mechanism (not shown) as described herein or as in any one of the variators illustrated in the Figures.

The variator has first and second input races 12, 14 having faces 16, 18 which are semi-toroidally recessed. Between the input races are first and second output races 20, 22 and these too have semi-toroidally recessed faces 24, 26, so that between the first input and output races 12, 20 is formed a first toroidal cavity 28, and between the second input and output races 22, 14 is formed a second toroidal cavity 30. The races have a common axis defined by a main shaft 31 and are rotatable about it.

Each cavity 28, 30 contains a set of rollers 32, 34. Each roller is mounted for rotation about a roller axis such as 36, and runs upon the semi-toroidal faces of the adjacent input and output races, to transfer drive from one to the other. The main shaft 31 of the variator serves as its rotary input, and would typically be coupled to a rotary driver such as an engine (not shown). A gear 40, co-axial with and secured to the second output race 22, serves as the rotary output of the variator and in a complete transmission would typically be coupled through a chain running upon the gear 40 and through further gearing to a point of power usage, such as the driven wheels of a motor vehicle.

The endload needed to provide traction between the pair of races 12 14 and the pair of races 20,22 and the rollers 32, 34 is created by first and second biasing devices 42, 44, whose construction and function will now be explained.

Note first of all that the second input race 14 is fixed upon the main shaft 31 and so rotates along with it. However the first input race 12 is capable of rotational and axial movement relative to the main shaft 31. Torque applied to the main shaft 31 is referred to the first input race 12 through the first biasing device 42. In the present exemplary embodiment it is formed by (a) a torsion plate 46 which is immovably fixed upon the main shaft 31, (b) the rear face 45 of the input race 12, and (c) a set of balls 48 interposed between the torsion plate and the race. The rear face 45 of the input race 12 has a set of circumferentially extending recesses forming ramp surfaces 50. Each ramp surface 50 can be described as having two helical regions or ramps of opposite pitch. The torsion plate 46 has a complementary set of circumferentially extending recesses forming ramp surfaces 52 which are part-circular when viewed in radial section and each of which is of shallow "V" form, to provide two oppositely pitched ramps 54, 56.

The biasing device 42 applies an axial force to the first input race 12 which is a function of the torque applied to the race (i.e. to the input variator input torque) with a gain $R_i$. To appreciate this, consider that when no torque is applied, the input race 12 is able to adopt a position in which the deepest regions of the recesses forming the ramp surfaces 50, 52 are aligned, the balls 48 lying in these regions, to minimise separation of the race 12 and torsion plate 46. If a torque is applied to the main shaft 31, this is directly transmitted to the torsion disc 46, but it is only transmitted to the input race 12 through the balls 48.

The race 12 is thus caused to rotate through a small angle relative to the torsion disc 46. Hence the balls 48 ride up the ramp surfaces 50, 52, urging the input race 12 toward the other races to provide end load. Due to the inclination of the ramp surfaces to the radial plane, the contact force between each of the balls and the first input race 12 has a circumferential component—that is, a torque—and in this way the input torque is referred to the input race. It will be apparent that the force applied by the biasing device 42 is related to the input torque. The precise relationship depends on the shapes chosen for the recesses, but in the present embodiment, the force is substantially proportional to the input torque. Note also that by virtue of the "V" section of the recesses, input torque in either rotational direction (clockwise or anti-clockwise) creates a force in the same axial direction, contributing to the endload.

To keep the balls 46 properly located relative to each other, a registration disc 60 is positioned between the torsion disc 46 and the first input race 12, receiving the balls in respective through-going holes 62.

To now explain the operation of the second biasing device 44, it should firstly be noted that the output races 20, 22 upon which the device acts are mounted upon the main shaft 31 through respective bearings 64, 66 carried upon the main shaft 31, and rotate in the opposite direction to the main shaft. They are also capable of at least some rotational motion relative to each other, and of relative axial motion. The second biasing device serves to urge the two races axially away from each other with a force which is a function of the variator output torque with a gain $G_o$. It comprises balls 68 received in recesses in opposed faces of the first output race 20 and the output gear 40. These recesses are part-circular when viewed in a radial plane and form ramp surfaces of shallow V shape (not seen in the drawings) similar to those found in the first biasing device 42. Variator output torque acting upon the gear 40 is directly referred to the second output race 22, to which the gear is attached, but is transmitted to the first output race 20 through the second biasing device, which operates in like manner to the first biasing device 42 to urge the two output races apart.

No thrust bearing is needed to withstand the forces applied by the first and second biasing devices 42, 44 because they are instead referred through the torsion disc 46 and the second input race 14 to the main shaft 31, which is thus in tension. Because the first and second biasing devices work in opposition, the actual endload they create is not the sum of their contributions. Instead, at any given moment one force overcomes the other and their combined contribution is equal to the larger of the two. Hence at some times endload is varied in dependence upon variator input torque with a gain $G_i$. At other times endload is varied in dependence upon output torque with a gain $G_o$. Which mode of control prevails depends upon the relative magnitudes of the input and the output torques and the gains $G_i$, $G_o$.

An optional spring 70 sandwiched between the output races 20, 22 provides an additional contribution to the endload. It is formed as a "Belleville washer"—a conical, resiliently deformable disc which urges the two output races away from each other and so creates an endload even when the variator is subject to no torque. This provides a pre-loading function to prevent slip when torques on the variator input and output are very low. It can also provide a desirable contribution to the endload, which while the output torque dominates is added to the contribution made by the second biasing device 44 and can help to better approximate the desired endload characteristic. A further spring may be placed between the first input race 12 and the torsion disc 46, to provide a similar contribution when it is the input torque that dominates.

As is the case with other embodiments of the invention, in this embodiment, $R_i \neq R_o$ by a substantial amount (in excess of 1%, and possibly in excess of 5%, 10% or 25%) whereas the trigonometric tangent of the input and output cam ramp angles ($\tan(\theta_i)$ and $\tan(\theta_o)$ respectively) do not vary as the inverse of $R_i$ and $R_o$ respectively, such that the input and output cam gains are unequal to one another.

Figure 17:
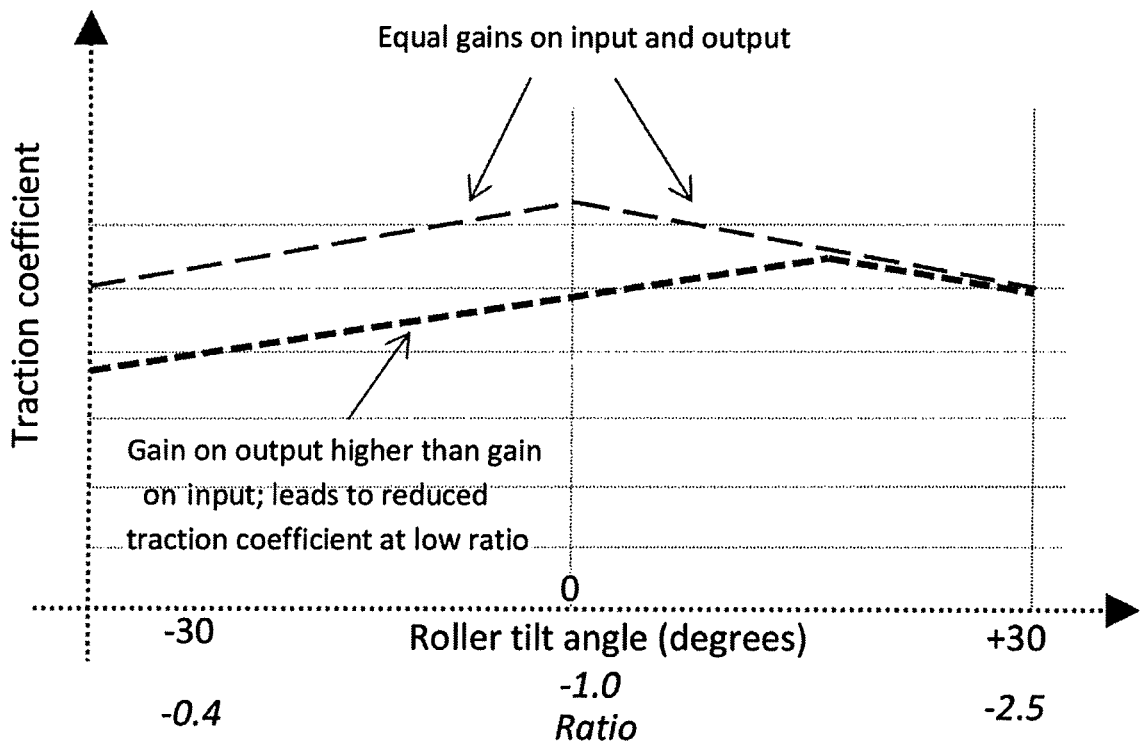
FIG. 17 is a graph showing the characteristics of a conventional equal gain end-load system, together with an 'unequal' gain end-load configuration according to an embodiment of this invention in which the output gain is greater than the input gain.
Figure 18:
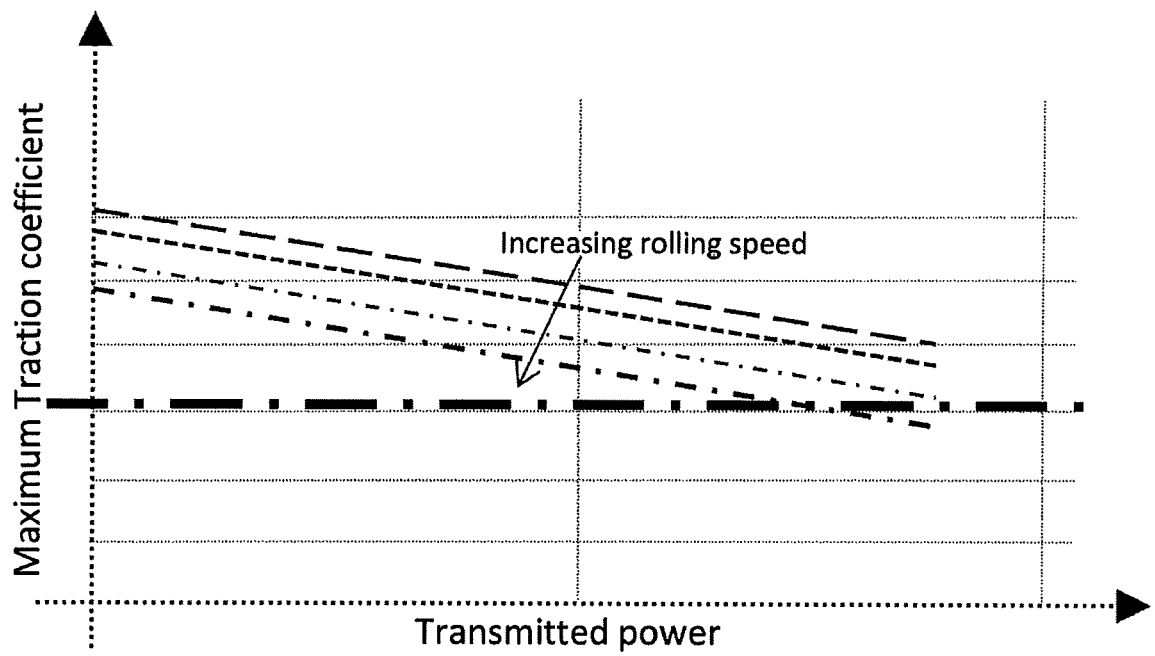
FIG. 18 shows trends of how the maximum traction coefficient tends to vary with rolling speed and transmitted power.

FIG. 17 is a graph showing the characteristics of a conventional equal gain endload system together with a biasing configuration according to an embodiment of this invention. The example here is given for a full toroidal variator. For the conventional system shown (long dashed line) the input and output gains are equal. The ratio at which one biasing device becomes dominant over the other (the "hand-over ratio") is at or close to the −1.0 ratio point. On positive ratio devices such as some ball bearing variators this hand-over ratio may be at or close to the +1.0 ratio point. The slight slope on the traction coefficient graph is primarily due to the fact that, for a given tangential contact (shear) force, the torque imparted to the active biasing device and therefore the endload generated by this device is highest when the roller contacts at a large radius from the variator axis. Thus at the extremes of ratio there is more normal contact force in proportion to tangential contact (shear) force, this reducing the traction coefficient compared to the traction coefficient at unity ratio. This results in an inverted V profile in traction coefficient characteristic as ratio is swept from minimum to maximum, although the traction coefficient at minimum and maximum ratio are in fact equal in this conventional endload arrangement. In the unequal gain system according to this embodiment of the invention (short dashed line), despite the inverted V-shape, the traction coefficient achieved is greater at maximum ratio (−2.5) than at minimum ratio (−0.4). Therefore this unequal endload gain system achieves a general trend of increasing traction coefficient with increasing absolute ratio. Note that in this example the output gain is higher than the input gain, FIG. 18 describes the trends of how maximum sustainable traction coefficient tends to vary with rolling speed and variator transmitted power. It has been found that maximum traction coefficient (y-axis) generally falls with increasing transmitted power (x-axis). Each line represents a certain rolling speed condition, therefore FIG. 18 also shows how traction coefficient generally falls with increasing rolling speed. Assuming that this graph was taken to show the range of maximum variator traction coefficients (these being the maximum tolerable traction coefficients) of the variator in a particular application under various operating conditions, then the thick black line in FIG. 18 would be interpreted as the traction coefficient for which the device would need to be configured, assuming that it incorporated an end load system configured to provide an at least substantially constant traction coefficient. However, to design to such a constant traction coefficient could lead to over-clamping of the variator at many other operating conditions where a higher traction coefficient was acceptable.

By observing how power and rolling speed vary across the operating envelope of the variator in particular applications, and specifically across the ratio range of the variator, the endload gains may be tailored such that the variator operates near the maximum traction coefficient over much of its operating envelope. The following description describes how the unequal gain endload system may be tailored for various applications when they are operating at a full power or maximum load condition, these generally being most challenging for traction.

Figure 19:
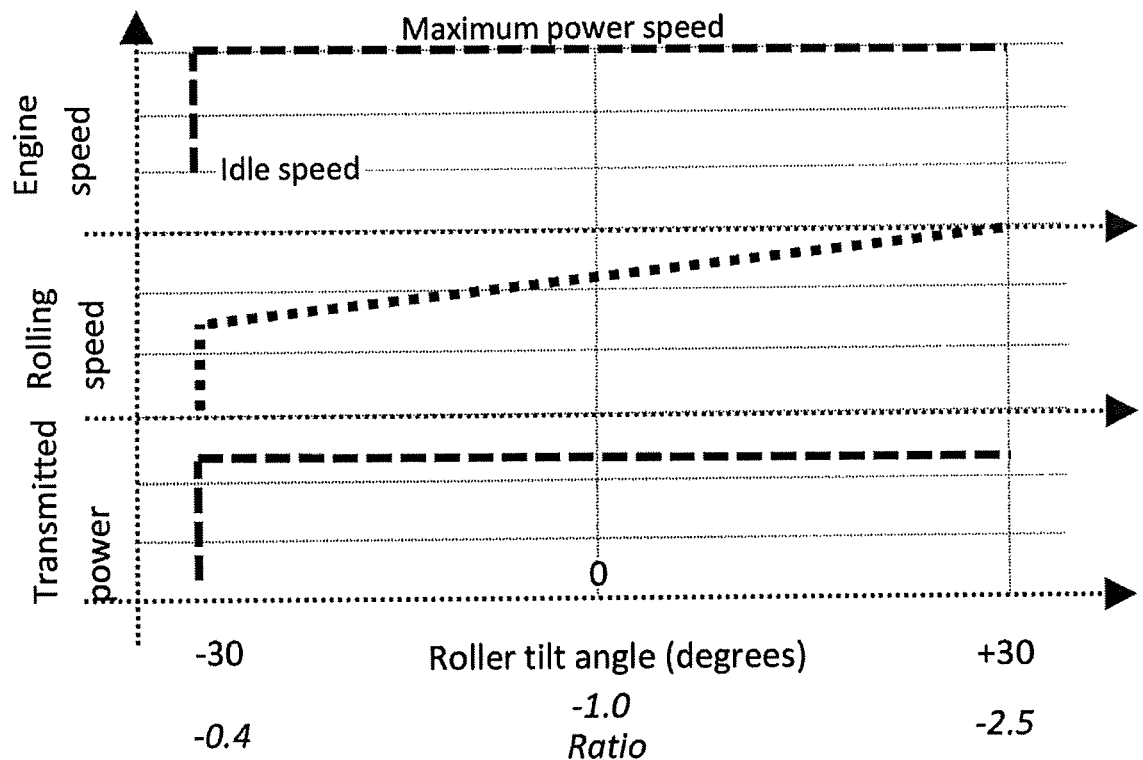
FIG. 19 shows how rolling speed and transmitted power vary with variator ratio for a conventional main drive CVT (variator) application.

FIG. 19 shows how rolling speed and power vary with ratio for a typical main drive CVT application. Such an application may be used in a vehicle such as a passenger car, a bus or an off-highway vehicle such as a construction vehicle (e.g. a loader). In such an application, the engine may operate at a speed that is lower than that at which it delivers maximum power. This may be an idle speed. Thus the engine delivers a relatively low power whilst the vehicle launches from rest, for example using a clutch. The engine may then climb to a maximum engine power speed during which time the vehicle speed increases, but, as shown by the vertical portion of the dashed line in the top sub-graph of FIG. 19, the CVT ratio remains constant. The middle and lower sub-graphs respectively show the contact rolling speed and engine power increasing at constant variator ratio, implying lower maximum available traction at high variator ratio. This implies that the maximum traction coefficient will generally fall as ratio is swept from minimum to maximum.

Figure 16B:
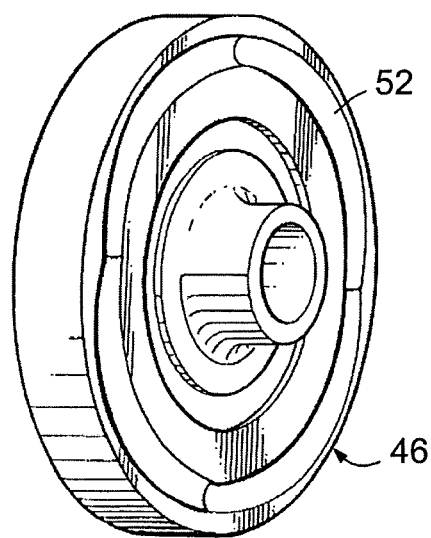
Figure 16C:
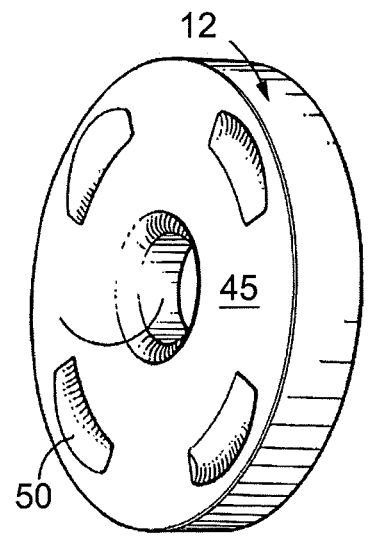
Figure 16D:
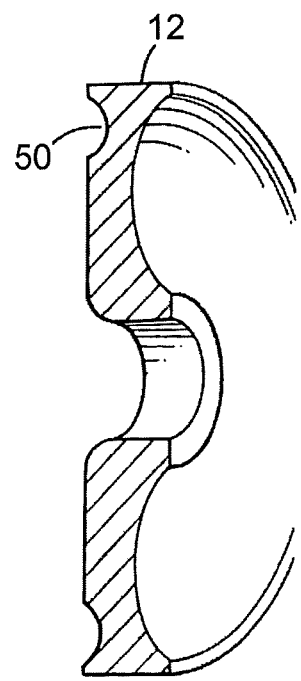
Figure 16E:
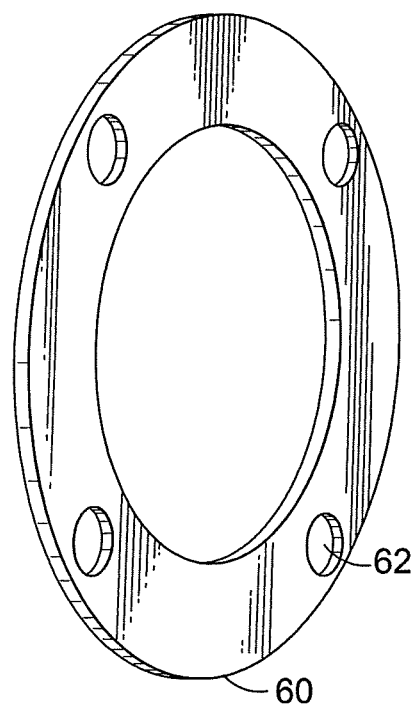
Figure 20:
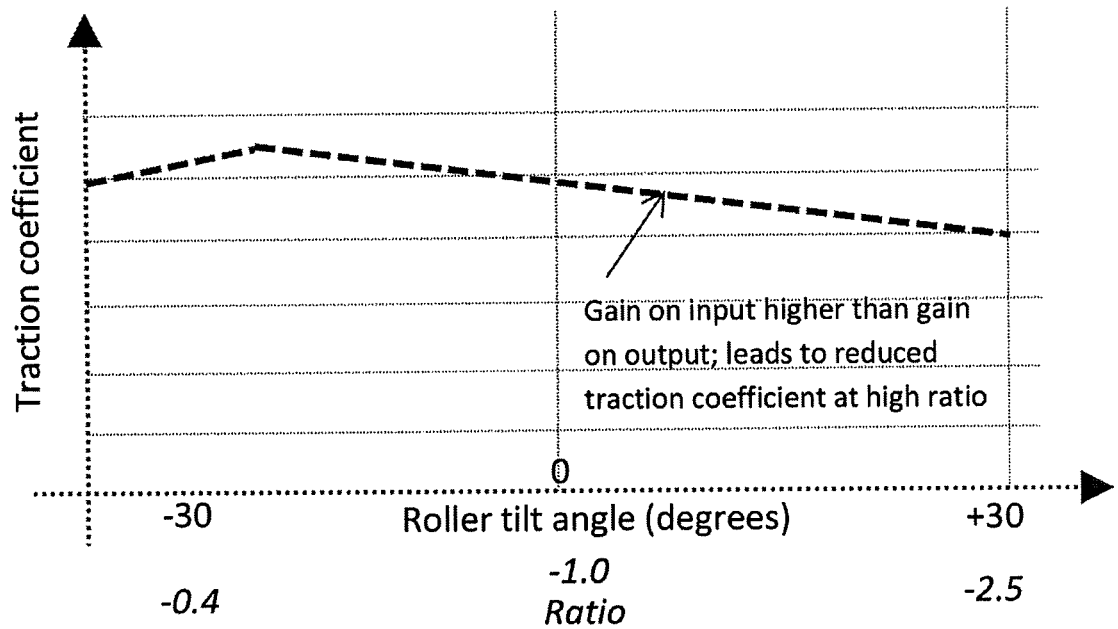
FIG. 20 shows a preferable endload biasing configuration according to an embodiment of the invention for the application of FIG. 19.

Turning to FIG. 20, it may be seen that the traction coefficient characteristic has been tailored for the CVT configuration of FIG. 19. This has been achieved by selecting an input gain that is greater than the gain of the output biasing device. Notice that, in this example, the vehicle is in a drive mode: that is, the engine is delivering power to the wheels and the CVT torque will be in a similar sense throughout the acceleration. Thus, the input gain should preferably be greater than the output gain at least in a positive (driving) torque sense on both the input and the output biasing devices. However, such a main drive CVT is also capable of transmitting torque in a counter direction, therefore the biasing devices should be adapted for bi-directional torque transfer. The ramp profiles would therefore take the form of a vee as shown in FIG. 16*b*.

Figure 21:
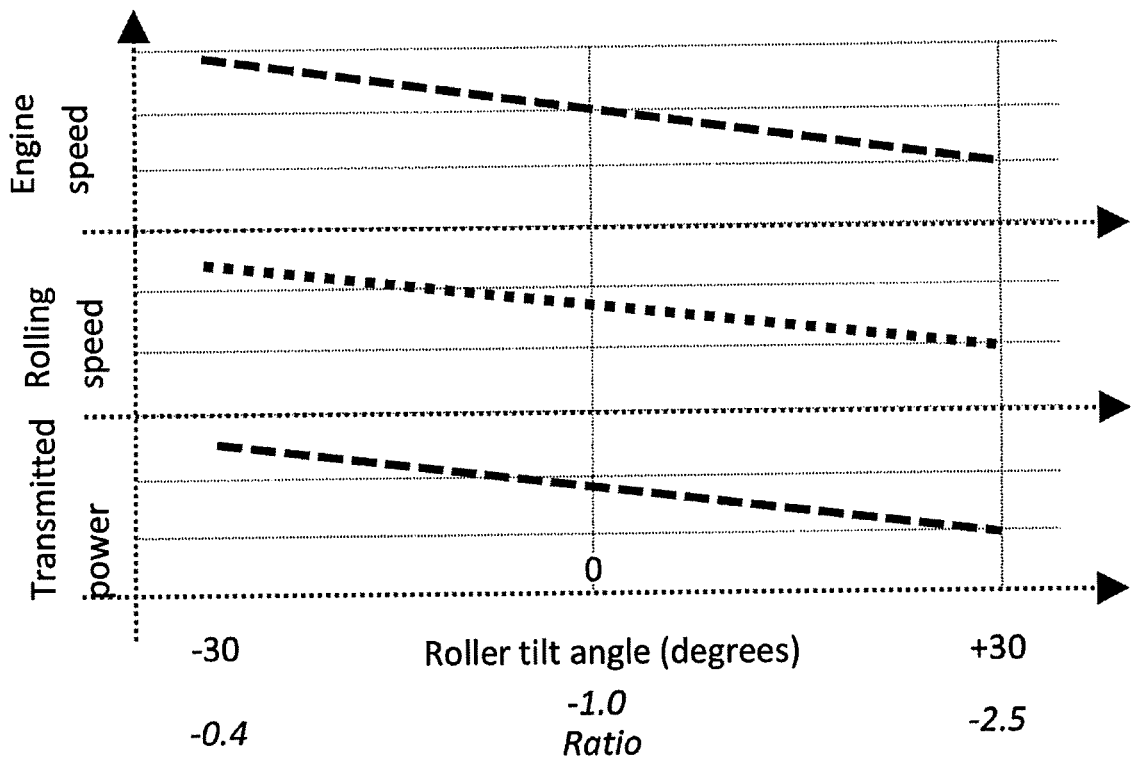
FIG. 21 shows how rolling speed and transmitted power vary with ratio for a conventional supercharger application that includes a centrifugal (or other dynamic) compressor.

FIG. 21 shows how rolling speed and power vary with ratio for a variable speed supercharger application that includes a centrifugal (or other dynamic) compressor. In such an application, the centrifugal compressor may operate at a constant speed whilst the engine sweeps from minimum to maximum, as previously described. As the engine speed increases, the ratio is swept from maximum to towards minimum in order to maintain the constant compressor speed, and as this happens the power transmitted and the rolling speed increases, as shown in the bottom and middle sub-graphs respectively of FIG. 21. The effect of increasing both rolling speed and power is to reduce the maximum sustainable traction coefficient. Thus as ratio is swept from maximum to minimum (right to left in FIG. 21) the maximum traction coefficient falls.

Figure 22:
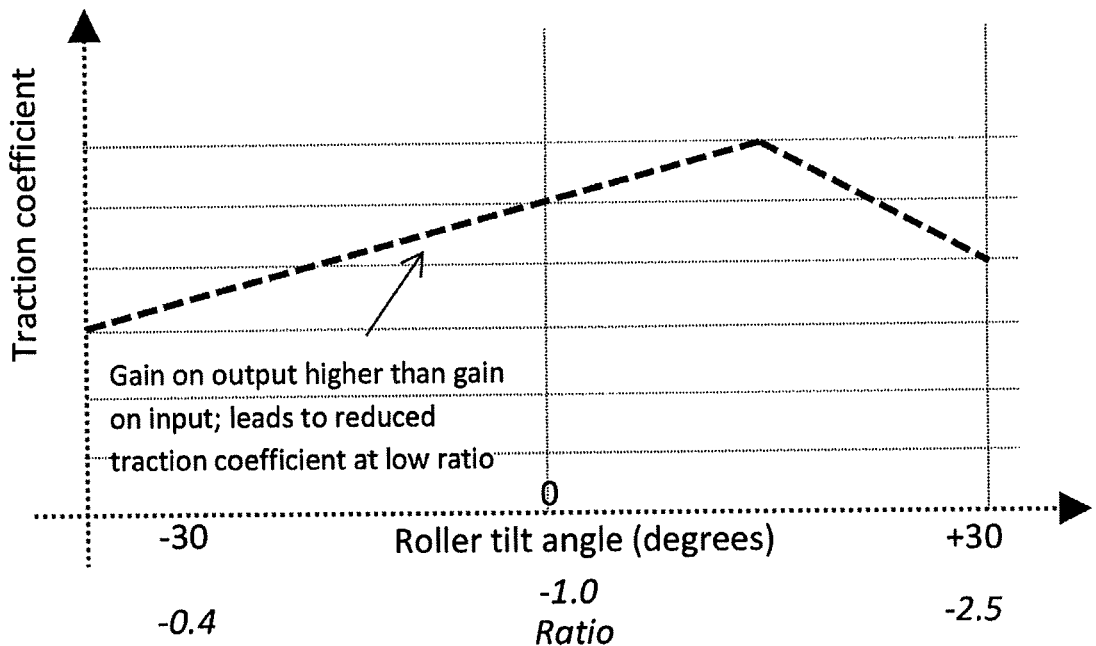
FIG. 22 shows a preferable endload biasing configuration according to an embodiment of the invention for the application of FIG. 21.

FIG. 22 shows how the preferable endload biasing configuration for the variable speed centrifugal compressor application of FIG. 21. It may be seen that the traction coefficient characteristic has been suitably tailored because the traction coefficient achieved is lower at minimum ratio than at maximum ratio. This has been achieved by selecting an output biasing device gain that is greater than that of the input biasing device. In such an application, the driven device is typically capable of accepting only a positive (drive) torque, therefore the biasing devices may preferably be unidirectional for torque (a single ramp as shown in FIG. 7, rather than a vee). Thus the output gain should preferably be greater than the input gain in this positive (driving) torque sense, and preferably the ramp may be absent in the opposing torque sense.

Figure 23:
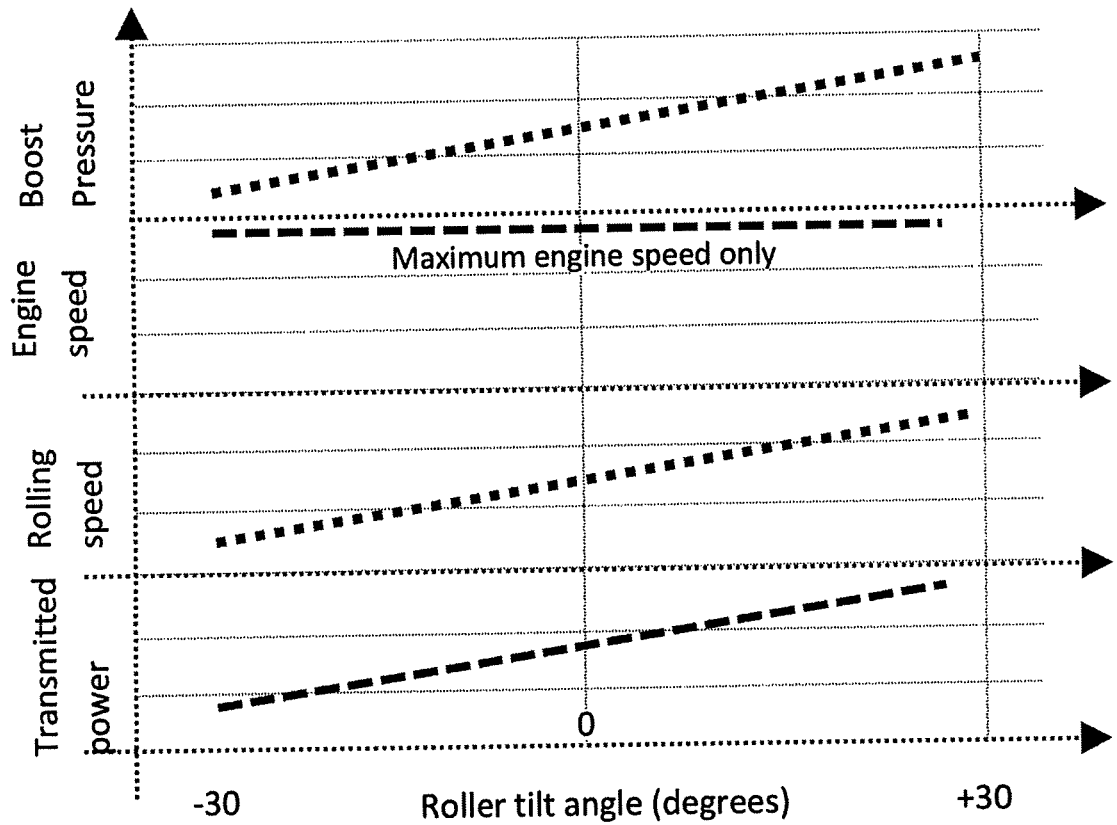
FIG. 23 shows how rolling speed and transmitted power vary with ratio for a conventional supercharger application that includes a positive displacement compressor.

FIG. 23 shows how rolling speed and power vary with ratio for a typical variable speed supercharger application that includes a positive displacement compressor. The graph here is slightly different from that in FIG. 22 in that the engine speed is held constant at its maximum speed throughout the ratio sweep, this representing the most challenging conditions for traction in the variator. Boost pressure is generally a function of CVT ratio for the case of a variable speed positive displacement supercharger. The graph in FIG. 23 therefore describes the characteristics of a variable drive positive displacement compressor at maximum engine speed, and across all boost pressures (that is to say, all variator ratios). The second sub-graph shows the engine speed to be constant across all ratios, whilst the top sub-graph shows the boost pressure increasing with increasing ratio. It can be seen from the third and fourth sub-graph that rolling speed and power (respectively) both increase with increasing boost pressure for a given engine speed, thus implying that the maximum traction coefficient will generally fall as ratio is swept from minimum to maximum.

Figure 24:
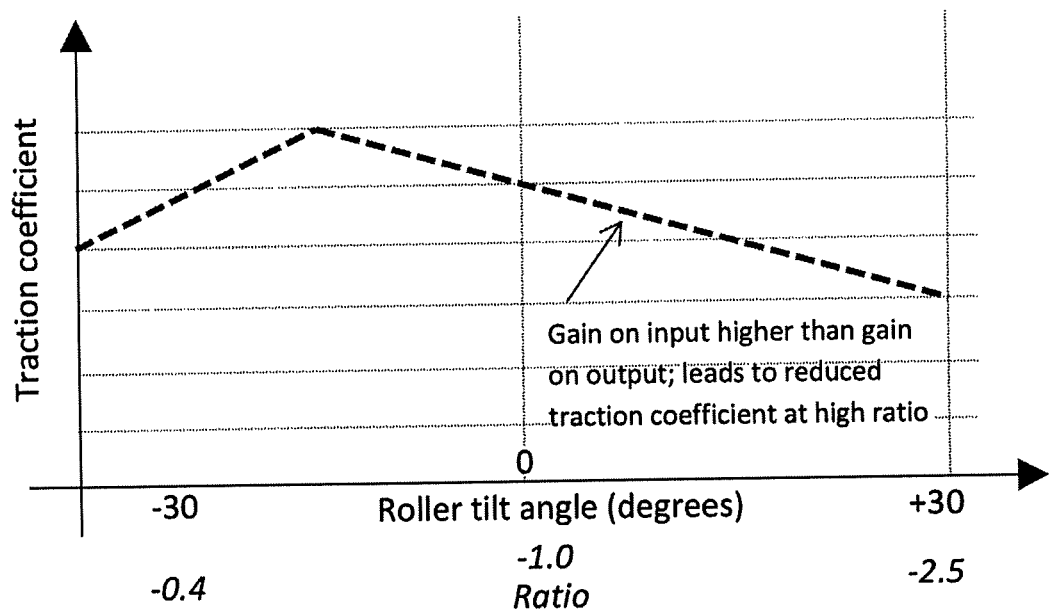
FIG. 24 shows a preferable endload biasing configuration according to an embodiment of the invention for the application of FIG. 23.

FIG. 24 shows a preferable endload biasing configuration for the application of FIG. 23. It may be seen that the traction coefficient characteristic has been suitably tailored because the traction coefficient achieved is lower at maximum ratio than at minimum ratio. This has been achieved by selecting an input biasing gain that is greater than that of the output biasing device. A variator used for this application should be capable of transmitting torque in both torque directions so the biasing devices should be adapted for bidirectional torque transfer by incorporating ramps in the form of a vee, as described previously.

The invention has been described above purely by way of example. Modifications in detail are possible, as it will be appreciate by the skilled person, within the scope of the appended claims.

The invention claimed is:

1. A variator for transmitting rotary motion between a rotary variator input and a rotary variator output at a range of ratios variable between a minimum and a maximum ratio, the variator comprising:

an input member operatively coupled to the variator input and an output member operatively coupled to the variator output;

transfer means disposed in rolling contact with the input and output members to transfer rotary motion between them;

the input member being coupled to the variator input through a first biasing device which is configured to transmit rotary motion from one to the other and is arranged to exert a first biasing force on the variator, the first biasing device having a first, input gain relating input torque acting on the input member to the first biasing force;

the output member being coupled to the variator output through a second biasing device which is configured to transmit rotary motion from one to the other and is arranged to exert a second biasing force on the variator, the second biasing device having a second, output gain relating output torque acting on the output member to the second biasing force;

the first and second biasing forces both being directed such as to urge the input and output members into engagement with the transfer means to provide traction between them; wherein the first, input gain and second, output gain are different.

2. A variator according to claim 1, wherein the gain of one of the biasing devices is at least 1% greater than the gain of the other biasing device; optionally wherein the gain of one of the biasing devices is at least 10% greater than the gain of the other biasing device; optionally wherein the gain of one of the biasing devices is at least 25% greater than the gain of the other biasing device.

3. A variator according to claim 1, wherein the variator is a toroidal variator; optionally wherein the variator is a full-toroidal variator; optionally wherein the variator is a ball bearing or ball-and-disc type variator.

4. A variator according to claim 1, wherein the variator is configured such that the first and second biasing forces are configured to act in opposition whereby one or other of the first and second biasing forces is configured to dominate and determine a resultant biasing force applied by the first and second biasing devices.

5. A variator according to claim 1, wherein the first gain is given by a rate of change of the first biasing force with respect to applied input torque and the second gain is given by a rate of change of the second biasing force with respect to applied output torque.

6. A variator according to claim 1, wherein the first gain when a given torque magnitude is applied to the input is different to the second gain when the same given torque magnitude is applied to the output.

7. A variator according to claim 1, wherein at least one of the first and second biasing devices comprises a cam and the first and second gain of the first and second biasing device respectively can each be calculated according to the formula:

$$G = \frac{T}{\tan(\theta).R}$$

where
G is the gain;
θ is a local ramp angle of the cam; and
R is the distance of the rolling elements from the variator axis.

8. A variator according to claim 1, wherein at least one of the first and second biasing devices comprises a cam having a ramp, wherein the cam comprises a link configured to transmit torque to one race or to both of the input member and the output member, whereby such torque causes displacement of the cam from a rest position, wherein the link comprises rolling elements that lie on at least one circumferential ramp of the cam.

9. A variator according to claim 8 wherein the at least one ramp has a variable angle that increases with increasing displacement of the cam.

10. A variator according to claim 8, wherein the ramp includes an endstop to limit the angular rotation of the cam.

11. A variator according to claim 1, the variator further comprising:

an input race and an output race each having a working surface, the races being coaxially mounted for rotation about a variator axis, and a toroidal cavity being defined between the working surfaces;

one or more rolling elements disposed between and being in driving engagement with the working surfaces at respective contact regions, each rolling element having at least one contact with a working surface, a second rolling contact, and being mounted on a carriage assembly for rotation about a rolling axis, the contact between the working surface being variable in accordance with a ratio of the variator; wherein:

each roller is mounted for pivotal movement that causes a change in a pitch angle of the roller, the pitch angle being about a pitch axis that passes through the contact regions;

the variator further comprising a control member operative to actuate the roller to undertake the said pivotal movement thereby changing the pitch angle, so urging the carriage to pivot about its tilt axis and thereby provide a change in variator ratio.

12. A variator according to claim 1, the variator having a ratio range defined as a ratio between the maximum variator ratio over the minimum variator ratio of greater than 4, greater than 5, greater than 6 or greater than 7.

13. A transmission for a machine or vehicle comprising a variator according to claim 1, wherein the variator is configured to operate across a variator envelope comprising a magnitude of a total contact power loss of the variator at an absolute maximum speed ratio and a magnitude of a total contact power loss of the variator at an absolute minimum speed ratio, wherein across the entire operating envelope of the variator, the magnitude of the total contact power loss of the variator at the absolute maximum speed ratio is greater than that at the absolute minimum speed ratio and wherein the first, input gain of the input biasing device is greater than that of the second, output biasing device.

14. A transmission for a machine or vehicle comprising a variator according to claim 1, wherein the variator is configured to operate across a variator envelope comprising a magnitude of a total contact power loss at an absolute maximum speed ratio and a magnitude of a total contact power loss at an absolute minimum speed ratio, wherein across the entire operating envelope of the variator, the magnitude of the total contact power loss of the variator at the absolute maximum speed ratio is less than that at the absolute minimum speed ratio and wherein the second, output gain of the output biasing device is greater than that of the first, input biasing device.

15. A transmission for a machine or vehicle comprising a variator according to claim 1, wherein the variator is configured to operate across a variator envelope comprising a maximum magnitude of transmitted power at an absolute maximum speed ratio and a maximum magnitude of transmitted power at an absolute minimum speed ratio, wherein across the operating envelope of the variator, the maximum magnitude of transmitted power of the variator at the absolute maximum speed ratio is greater than that at the absolute minimum speed ratio and wherein the gain of the first, input biasing device is greater than that of the second, output biasing device.

16. A transmission for a machine or vehicle comprising a variator according to claim 1, wherein the variator is configured to operate across a variator envelope comprising a maximum magnitude of transmitted power at an absolute maximum speed ratio and a maximum magnitude of transmitted power at an absolute minimum speed ratio, wherein, across the entire operating envelope of the variator, the maximum magnitude of transmitted power of the variator at the absolute maximum speed ratio is less than that at the absolute minimum speed ratio and wherein the gain of the second, output biasing device is greater than that of the first, input biasing device.

17. A transmission for a machine or vehicle comprising a variator according to claim 1, wherein the variator is configured to operate across a variator envelope comprising a maximum magnitude of rolling speed of the variator at an absolute maximum speed ratio and a maximum magnitude of rolling speed of the variator at an absolute minimum speed ratio, wherein across the entire operating envelope of the variator, the maximum magnitude of rolling speed of the variator at the absolute maximum speed ratio is greater than that at the absolute minimum speed ratio and wherein the gain of the input biasing device is greater than that of the output biasing device.

18. A transmission for a machine or vehicle comprising a variator according to claim 1, wherein the variator is configured to operate across a variator envelope comprising a maximum magnitude of rolling speed of the variator at an absolute maximum speed ratio and a maximum magnitude of rolling speed of the variator at an absolute minimum speed ratio, wherein across the entire operating envelope of the variator, the maximum magnitude of rolling speed of the variator at the absolute maximum speed ratio is less than that at the absolute minimum speed ratio and wherein the gain of the output biasing device is greater than that of the input biasing device.

19. A transmission for a machine or vehicle comprising a variator according to claim 1, wherein the variator is configured to operate across a variator envelope comprising a maximum magnitude of variator output speed and a maximum magnitude of variator input speed, wherein across the entire operating envelope of the variator, the maximum magnitude of variator output speed is greater than the maximum magnitude of variator input speed and wherein the gain of the input biasing device is greater than that of the output biasing device.

20. A transmission for a machine or vehicle comprising a variator according to claim 1, wherein the variator is configured to operate across a variator envelope comprising a maximum magnitude of variator output speed and a maximum magnitude of variator input speed, wherein across the entire operating envelope of the variator, the maximum magnitude of the variator output speed is less than the maximum magnitude of variator input speed and wherein the gain of the output biasing device is greater than that of the input biasing device.

21. A transmission for a machine or vehicle comprising a variator according to claim 1, wherein the variator is configured to operate across a variator envelope comprising a maximum traction coefficient of the variator at an absolute maximum speed ratio and a maximum traction coefficient of the variator at an absolute minimum speed ratio, wherein, across the entire operating envelope of the variator, the maximum traction coefficient of the variator at the absolute maximum speed ratio is greater than that at the absolute minimum speed ratio and wherein the gain of the output biasing device is greater than that of the input biasing device.

22. A transmission for a machine or vehicle comprising a variator according to claim 1, wherein the variator is configured to operate across a variator envelope comprising a maximum traction coefficient of the variator at an absolute maximum speed ratio and a maximum traction coefficient of the variator at an absolute minimum speed ratio, wherein across the entire operating envelope of the variator, the maximum traction coefficient of the variator at the absolute maximum speed ratio is less than that at the absolute minimum speed ratio and, wherein the gain of the input biasing device is greater than that of the output biasing device.

23. A supercharger assembly comprising a supercharger and a variator according to claim 1; optionally wherein the supercharger assembly comprises a compressor; optionally wherein the compressor is a dynamic compressor; optionally wherein the gain of the output biasing device is greater than the gain of the input biasing device.

24. A supercharger assembly comprising a supercharger, a variator according to claim 1 and further comprising a compressor, wherein the compressor is a positive displacement compressor; optionally wherein the gain of the input biasing device is greater than the gain of the output biasing device.

* * * * *